US012230219B2

(12) United States Patent
Hatayama et al.

(10) Patent No.: US 12,230,219 B2
(45) Date of Patent: *Feb. 18, 2025

(54) MODE SWITCHING IN DISPLAY DEVICE FOR DRIVING A DISPLAY PANEL

(71) Applicant: Synaptics Incorporated, San Jose, CA (US)

(72) Inventors: Hirokazu Hatayama, Kanagawa (JP); Makoto Takeuchi, Kanagawa (JP); Shigeru Ota, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,654

(22) Filed: Nov. 9, 2023

(65) Prior Publication Data

US 2024/0071319 A1 Feb. 29, 2024

Related U.S. Application Data

(63) Continuation of application No. 17/703,925, filed on Mar. 24, 2022, now Pat. No. 11,854,491.

(51) Int. Cl.
*G09G 3/3275* (2016.01)

(52) U.S. Cl.
CPC ....... *G09G 3/3275* (2013.01); *G09G 2360/02* (2013.01)

(58) Field of Classification Search
CPC .... G09G 3/3275; G09G 2360/02; G09G 5/12; G09G 2330/021; G09G 2340/0435; G09G 2360/18; G09G 3/20; G09G 3/3225; G09G 2230/00; G09G 2310/027; G09G 2310/04; G09G 2310/08
See application file for complete search history.

(56) References Cited

U.S. PATENT DOCUMENTS

| | | | | | |
|---|---|---|---|---|---|
| 10,070,018 | B2 * | 9/2018 | Kuroiwa | H04N 5/08 | |
| 11,238,779 | B1 * | 2/2022 | Maruyama | G09G 3/3275 | |
| 11,487,384 | B1 * | 11/2022 | Wang | G06F 3/04166 | |
| 2004/0119888 | A1 * | 6/2004 | Arai | H04N 5/126 | 348/E7.009 |
| 2005/0068327 | A1 * | 3/2005 | Tsumura | G06T 1/60 | 345/531 |
| 2006/0092100 | A1 * | 5/2006 | Chou | G09G 5/005 | 345/55 |

(Continued)

OTHER PUBLICATIONS

U.S. Appl. No. 17/703,925, filed Mar. 24, 2022, Pending.

*Primary Examiner* — Ibrahim A Khan
(74) *Attorney, Agent, or Firm* — Leydig, Voit & Mayer, Ltd.

(57) ABSTRACT

A display driver includes a memory, a data driver, and a control circuit. The data driver is configured to: in a first mode, update a display panel based at least in part on a command provided to the display driver asynchronously with a display vertical sync signal; and in a second mode, update the display panel based at least in part on first image data stored in the memory in synchronization with the display vertical sync signal. The control circuit configured to: switch from the first mode to the second mode in response to a first command; and, in the second mode, adjust the display vertical sync signal based at least in part on an external vertical sync signal.

17 Claims, 21 Drawing Sheets

(56) References Cited

U.S. PATENT DOCUMENTS

| | | | | |
|---|---|---|---|---|
| 2008/0259221 | A1* | 10/2008 | Longchambon | H04N 21/4342 375/E7.274 |
| 2011/0234903 | A1* | 9/2011 | Hori | G09G 5/008 348/521 |
| 2012/0133635 | A1* | 5/2012 | Ji | G09G 3/3688 345/212 |
| 2013/0057763 | A1* | 3/2013 | Cha | G09G 5/12 348/554 |
| 2015/0033047 | A1* | 1/2015 | Byun | G09G 5/36 713/320 |
| 2015/0138212 | A1* | 5/2015 | Bae | G09G 5/006 345/520 |
| 2016/0012794 | A1* | 1/2016 | Takata | G09G 3/3696 345/96 |
| 2018/0040301 | A1* | 2/2018 | Bae | G09G 5/393 |
| 2018/0090105 | A1* | 3/2018 | Suzuki | G09G 5/18 |
| 2018/0158424 | A1* | 6/2018 | Okamoto | G09G 5/008 |
| 2018/0277034 | A1* | 9/2018 | Kim | G09G 3/2092 |
| 2018/0293949 | A1* | 10/2018 | Nakamura | G09G 5/399 |
| 2020/0184929 | A1* | 6/2020 | Liu | G06F 3/1454 |
| 2020/0243035 | A1* | 7/2020 | Tanaka | H01L 27/1225 |
| 2020/0388245 | A1* | 12/2020 | Lee | G09G 5/37 |
| 2021/0149540 | A1* | 5/2021 | Shikata | G09G 3/20 |
| 2022/0051631 | A1* | 2/2022 | Cheon | G09G 3/3275 |
| 2022/0180841 | A1* | 6/2022 | Kim | G06F 9/541 |
| 2022/0199047 | A1* | 6/2022 | Rahman | G09G 5/006 |
| 2022/0343877 | A1* | 10/2022 | Park | G09G 5/12 |

* cited by examiner

Video Through Mode

MODE SWITCHING IN DISPLAY DEVICE FOR DRIVING A DISPLAY PANEL

CROSS-REFERENCE TO RELATED APPLICATIONS

This application is a continuation of U.S. patent application Ser. No. 17/703,925, filed on Mar. 24, 2022, which application is incorporated by reference herein in its entirety.

FIELD

The disclosed technology generally relates to display devices, more particularly to mode switching schemes for display devices.

BACKGROUND

A display driver that drives a display panel may be configured to receive image data from an external source (e.g., a host, a controller, a processor, or other devices configured to provide the image data). The image data transfer to the display driver may be asynchronous or synchronous with a vertical sync signal generated in the display driver. Some display drivers are adapted to both asynchronous and synchronous image data transfer. A display driver may be configured to, in an asynchronous mode, receive image data asynchronously with the vertical sync signal and update the display panel based on the received image data. The display driver may be further configured to, in a synchronous mode, receive image data and external synchronization (sync) control inputs (e.g., vertical sync packets and an external vertical sync signal) from the external source, generate the vertical sync signal based on the external sync control inputs, and update the display panel based on the received image data in synchronization with the generated vertical sync signal.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver includes a graphic random access memory (GRAM), a data driver, and a control circuit. The data driver is configured to, in a first mode, update a plurality of display elements of a display panel based at least in part on a command provided to the display driver asynchronously with a display vertical sync signal generated in the display driver. The data driver is further configured to, in a second mode, update the display elements of the display panel based at least in part on first image data stored in the GRAM in synchronization with the display vertical sync signal. The data driver is further configured to, in a third mode, update the display elements of the display panel in synchronization with an external vertical sync signal. The control circuit is configured to switch the display driver from the first mode to a second mode in response to a first command. The control circuit is further configured to, in the second mode, adjust the display vertical sync signal based at least in part on an external vertical sync signal. The control circuit is further configured to switch the display driver to the third mode after achieving synchronization of the display vertical sync signal with the external vertical sync signal.

In one or more embodiments, a display device is provided. The display device includes a display panel and a display driver. The display panel includes a plurality of display elements. The display driver includes a GRAM, a data driver, and a control circuit. The data driver is configured to, in a first mode, update the display elements based at least in part on a command provided to the display driver asynchronously with a display vertical sync signal generated in the display driver. The data driver is further configured to, in a second mode, update the display elements of the display panel based at least in part on first image data stored in the GRAM. The data driver is further configured to, in a third mode, update the display elements of the display panel in synchronization with an external vertical sync signal. The control circuit is configured to: switch the display driver from the first mode to a second mode in response to a first command. The control circuit is further configured to, in the second mode, adjust the display vertical sync signal based at least in part on an external vertical sync signal. The control circuit is further configured to switch the display driver to the third mode after achieving synchronization of the display vertical sync signal with the external vertical sync signal.

In one or more embodiments, a method for driving a display panel is provided. The method includes generating, based at least in part on a display vertical sync signal, emission pulses that control light emission of display elements of a display panel. The method further includes updating, in a first mode, the display elements based at least in part on a command provided to a display driver asynchronously with the display vertical sync signal. The method further includes switching the display driver from the first mode to a second mode in response to a first command. The method further includes updating, in the second mode, the display elements of the display panel based at least in part on first image data stored in a GRAM of the display driver. The method further includes switching the display driver to a third mode after achieving synchronization of the display vertical sync signal with the external vertical sync signal. The method further includes updating, in the third mode, the display elements of the display panel in synchronization with the external vertical sync signal.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are shown in the appended drawings. It is to be noted, however, that the appended drawings illustrate only exemplary embodiments, and are therefore not to be considered limiting of inventive scope, as the disclosure may admit to other equally effective embodiments.

Figure 1:
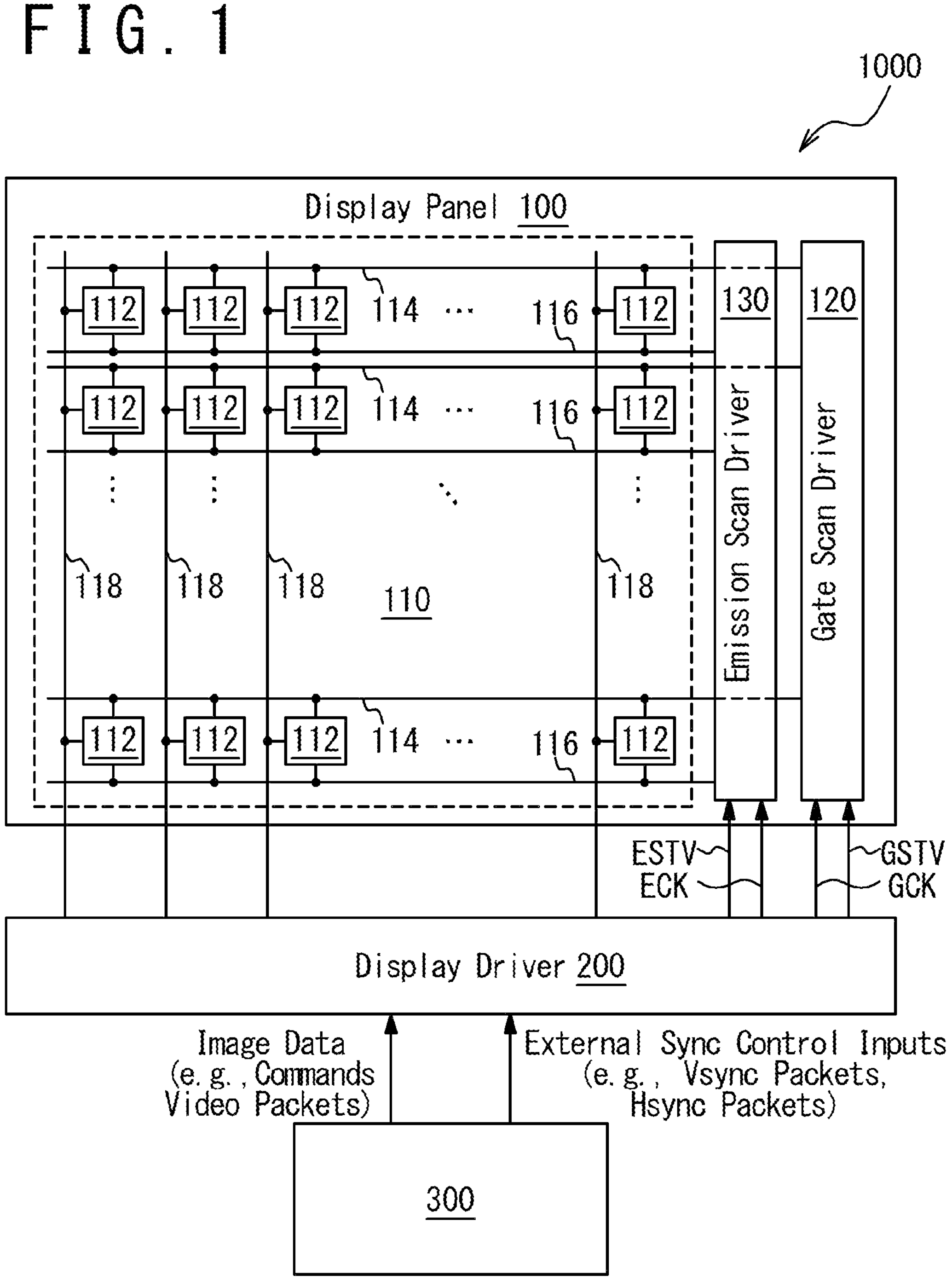
FIG. 1 shows an example configuration of a display device, according to one or more embodiment.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description. The term "coupled" as used herein means connected directly to or connected through one or more intervening components or circuits.

A display driver that drives a display panel may be configured to receive image data from an external entity (e.g., a host, a controller, a processor, or other devices configured to provide the image data). Image data transfer from the external entity to the display driver may be asynchronous or synchronous with a vertical sync signal generated in the display driver.

In an asynchronous mode, the external entity may encapsulate image data in one or more commands and send the one or more commands to the display driver at arbitrary timing, asynchronously with the vertical sync signal generated in the display driver. In this case, the display driver may retrieve the image data from the commands and update the display panel based on the retrieved image data.

In a synchronous mode, the external entity may send image data to the display driver with external sync control inputs, such as external sync packets (e.g., vertical sync packets and horizontal sync packets), and external sync signals (e.g., an external vertical sync signal and an external horizontal sync signal). In this case, the display driver may generate the vertical sync signal based on the external sync control inputs and update the display panel based on the image data in synchronization with the generated vertical sync signal.

Some display drivers are adapted to both asynchronous and synchronous image data transfer. Such a display driver may be configured to, in an asynchronous mode, update the display panel based on image data encapsulated in one or more commands received asynchronously with the vertical sync signal. The display driver may be further configured to, in a synchronous mode, receive image data and external sync control inputs (e.g., vertical sync packets and an external vertical sync signal) from the external source, generate the vertical sync signal based on the external sync control inputs, and update the display panel based on the received image data in synchronization with the generated vertical sync signal.

Mode switching from the asynchronous mode to the synchronous mode may cause display image artifacts since the mode switching may disturb the periodicity of the vertical sync signal generated in the display driver. The disturbed vertical sync signal may cause unsuccessful timing control in updating or controlling the display panel, resulting in display image artifacts. For example, in embodiments where light emission of display elements in the display panel are controlled in synchronization with the vertical sync signal, the disturbed periodicity of the vertical sync signal may disorder the light emission control, causing luminance unevenness in the display image.

The present disclosure provides various measures to mitigate display artifact potentially caused by the mode switching. In one or more embodiments, a display driver includes a graphic random access memory (GRAM), a data driver, and a control circuit. The data driver is configured to, in a first mode, update a plurality of display elements of a display panel based at least in part on a command provided to the display driver asynchronously with a display vertical sync signal generated in the display driver. The data driver is further configured to, in a second mode, update the display elements of the display panel based at least in part on first image data stored in the GRAM in synchronization with the display vertical sync signal. The data driver is further configured to, in a third mode, update the display elements of the display panel in synchronization with an external vertical sync signal. The control circuit is configured to switch the display driver from the first mode to a second mode in response to a first command. The control circuit is further configured to, in the second mode, adjust the display vertical sync signal based at least in part on an external vertical sync signal. The control circuit is further configured to switch the display driver to the third mode after achieving synchronization of the display vertical sync signal with the external vertical sync signal.

In such embodiments, the second mode uses the GRAM while adjusting the display vertical sync signal based on the external vertical sync signal. Accordingly, switching the display driver to the second mode may effectively improve flexibility in achieving synchronization between the external vertical sync signal and the display vertical sync signal. In one embodiment, the use of the second mode may mitigate display image artifacts potentially caused by disturbance in the periodicity of the display vertical sync signal. In the following, a detailed description is given of various embodiments of the present disclosure.

FIG. 1 shows an example configuration of a display device 1000, according to one or more embodiment. In the shown embodiment, the display device 1000 comprises a display panel 100 and a display driver 200. The display panel 100 may be a self-luminous display panel such as an organic light emitting diode (OLED) display panel and a micro light emitting diode (μLED) display panel. The display device 1000 is configured to display an image on the display panel 100 based on image data received from an external source 300. Examples of the external source 300 include a host, a controller, a processor, or other devices suitable for providing the image data.

In the shown embodiment, the display panel 100 includes a display area 110, a gate scan driver 120, and an emission scan driver 130. The display area 110 includes display elements 112, gate lines 114, emission lines 116, and source lines 118. The gate lines 114 are coupled to the gate scan driver 120 and the emission lines 116 are coupled to the emission scan driver 130. The source lines 118 are coupled to the display driver 200. Each row of display elements 112 is coupled to a corresponding gate line 114 and a corresponding emission line 116, while each column of display elements is coupled to a corresponding source line 118. Each display element 112 is configured to be updated or programed with a data voltage received from the display driver 200 and emit light with a luminance level corresponding to the data voltage. In embodiments where the display panel 100 is an OLED display panel, each display element 112 may include an OLED element configured to emit light according to the data voltage. In one or more embodiments, programing a display element 112 with a data voltage is achieved by asserting the gate line 114 coupled to the display element 112 while the display driver 200 generates the data voltage on the source line 118 coupled to the display element 112.

The gate scan driver 120 is configured to control update or programing of display elements 112 of respective "horizontal lines." A "horizontal line" referred herein is a row of display elements 112 coupled to the same gate line 114 and the same emission line 116. In one implementation, the gate scan driver 120 is configured to sequentially assert the gate lines 114 to sequentially allow programming of the display elements 112 of respective horizontal lines with data voltage generated by the display driver 200. The operation of the gate scan driver 120 may be controlled by a gate scan start pulse signal GSTV and a gate scan clock GCK received from the display driver 200.

The emission scan driver 130 is configured to control light emission of display elements 112 of respective horizontal lines with the emission lines 116. The emission scan driver 130 may be configured to, when allowing display elements 112 of a horizontal line to emit light, assert the emission line 116 coupled to the display elements 112 of the horizontal line. The emission scan driver 130 may be further configured to, when prohibiting display elements 112 of a horizontal line from emitting light, deassert the emission line 116 coupled to the display elements 112 of the horizontal line. The operation of the emission scan driver 130 may be controlled by an emission scan start pulse signal ESTV and an emission scan clock ECK received from the display driver 200.

The display driver 200 is configured to update the display elements 112 based at least in part on image data received from the external source 300. In one implementation, the image data include graylevels of the respective display elements 112. The display driver 200 may be configured to generate data voltages corresponding to the graylevels of the respective display elements 112 and update or program the display elements 112 with the generated data voltages via the source lines 118.

The display driver 200 is further configured to control the gate scan driver 120 with a gate scan start pulse signal GSTV and a gate scan clock GCK. The gate scan driver 120 may be configured to scan the gate lines 114 in response to the gate scan start pulse signal GSTV in synchronization with the gate scan clock GCK.

The display driver 200 is further configured to control the emission scan driver 130 with an emission scan start pulse signal ESTV and an emission scan clock ECK. The emission scan driver 130 may be configured to assert selected ones of the emission lines 116 in response to the emission scan start pulse signal ESTV in synchronization with the emission scan clock ECK. In one implementation, the emission scan start pulse signal ESTV carries emission pulses that control the display brightness level of the display device 1000. The display brightness level may be the overall brightness level of the image displayed on the display panel 100. Details of the control of the display brightness level based on the emission pulses in the emission scan start pulse signal ESTV will be described later in detail.

The display driver 200 is configured to receive external sync control inputs from the external source 300. The external sync control inputs may include vertical sync (Vsync) packets and horizontal sync (Hsync) packets. The Vsync packets may indicate starts of respective frame periods and thereby define the frame periods (or vertical sync periods). The Hsync packets may indicate starts of respective line periods (or horizontal sync periods) and thereby define the line periods. In other embodiments, the external sync control inputs may include an external vertical sync signal and an external horizontal sync signal. The display driver 200 may be configured to generate a display vertical sync signal and a display horizontal sync signal in response to the external sync control inputs and use the display vertical sync signal and the display horizontal sync signal for timing control in the display device 1000. For example, the display driver 200 may be configured to generate the gate scan start pulse signal GSTV and the emission scan start pulse signal ESTV based at least in part on the display vertical sync signal and the display horizontal sync signal.

In one or more embodiments, the display device 1000 is adapted to two image data transfer schemes: a command mode and a video through mode. In the command mode, the external source 300 provides one or more commands that encapsulate image data to display driver 200 only when desiring update of one or more display elements 112 in the display panel 100. The use of the command mode effectively reduces the power consumption of the display device 1000. In the command mode, the external source 300 provides one or more commands at arbitrary timing, not providing the external sync control inputs to the display driver 200. The display driver 200 generates the display vertical sync signal and the display horizontal sync signal by itself without using the external sync control inputs. The command mode can be considered as a sort of the asynchronous mode described above.

In the video through mode, the external source 300 continuously provides video packets that encapsulate image data to the display driver 200 (e.g., in the form of a video data stream) and the display driver 200 updates the display panel 100 based on the image data every frame period (or every vertical sync period). In the video through mode, the external source 300 provides the external sync control inputs as well as the video packets and the display driver 200 generates the display vertical sync signal and the display horizontal sync signal based on the external sync control inputs. The video through mode can be considered as a sort of the synchronous mode described above.

The mode switching from the command mode to the video through mode may cause display image artifacts since the mode switching may cause disturbance in the periodicity of the display vertical sync signal. In the following, the display brightness control is first described and then occurrence of a display image artifact caused by the mode switching is discussed.

Figure 2A:
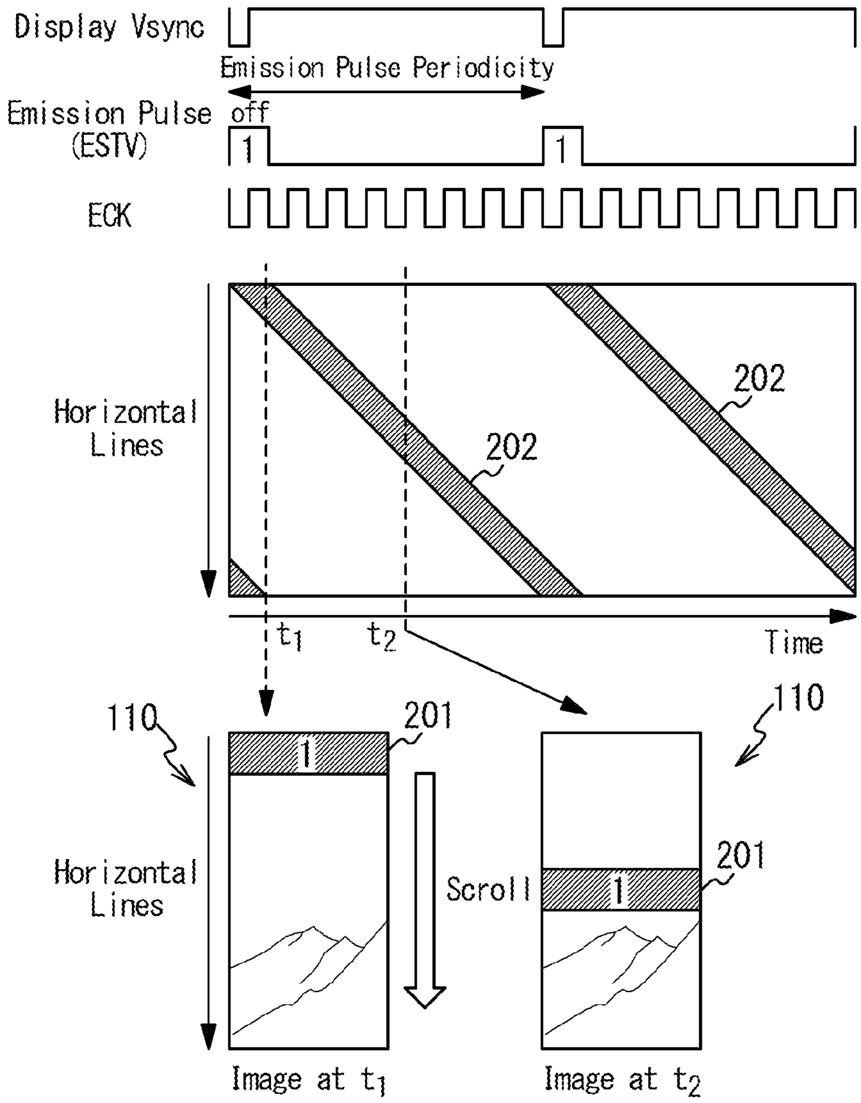
FIGS. 2A and 2B show example control of the display brightness level of the display device, according to one or more embodiments.
Figure 2B:
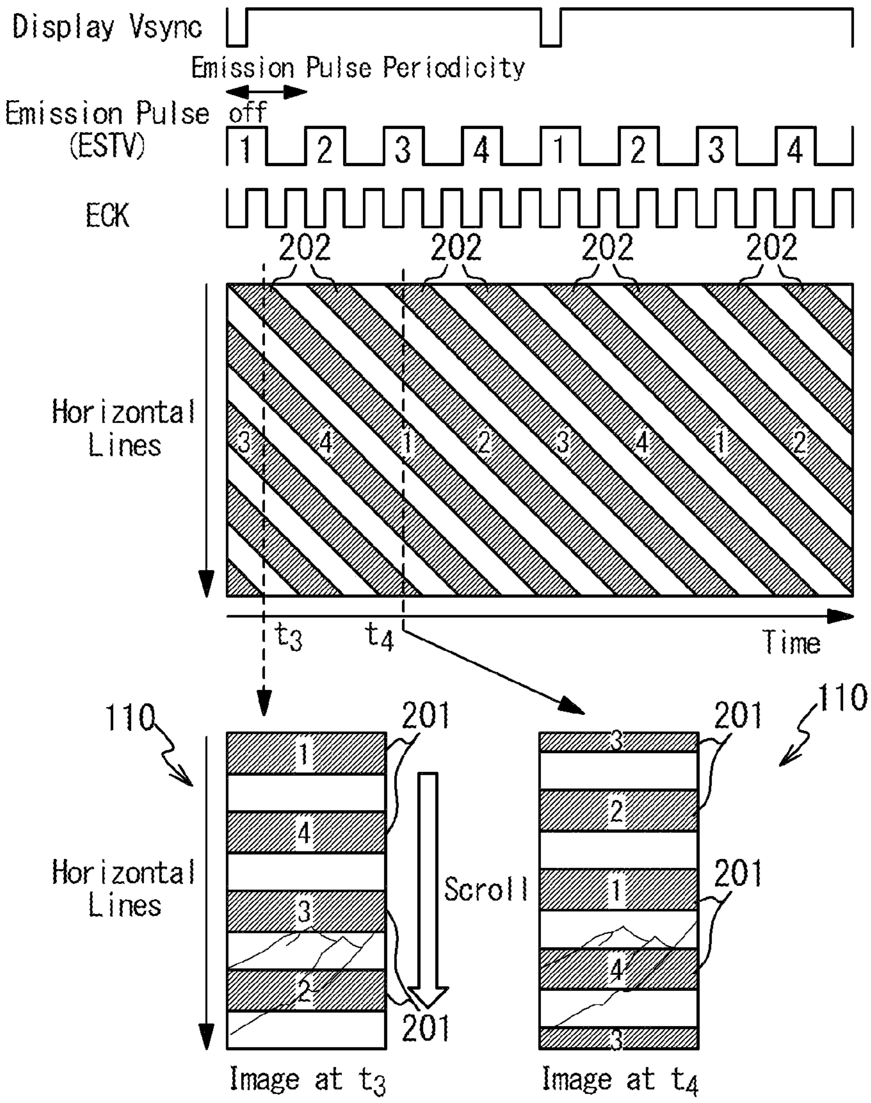

FIGS. 2A and 2B illustrates example control of the display brightness level of the display device 1000 based on emission pulses carried by the emission scan start pulse signal ESTV, according to one or more embodiments. The top parts of FIGS. 2A and 2B show example waveforms of the emission scan start pulse signal ESTV and the emission scan clock ECK while the bottom parts show example images displayed on the display panel 100 at certain instances of time (instances of time $t_1$ and $t_2$ for FIG. 2A and instances of time $t_3$ and $t_4$ for FIG. 2B). In FIGS. 2A and 2B, the numerals 201 denote non-light-emitting regions in which no display elements 112 emit light. In one implementation, emission lines 116 in the non-light-emitting regions are deasserted by the emission scan driver 130 to prohibit emit light from display elements 112 coupled to the emission lines 116. The display brightness level is controlled by the total area of the non-light-emitting regions in the display image.

The middle parts of FIGS. 2A and 2B show example over-time changes in horizontal lines located in non-light-emitting regions. The vertical axis represents horizontal lines while the horizontal axis represents the time. The hatched areas 202 indicate horizontal lines located in non-light-emitting regions.

In one or more embodiments, emission pulses carried by the emission scan start pulse signal ESTV controls the number and widths of non-light-emitting regions 201 in the display panel 100. Each emission pulse indicates the emission scan driver 130 (shown in FIG. 1) to introduce a non-light-emitting region 201 from the top edge of the display area 110. The width of the introduced non-light-emitting region 201 is based on the width of the emission pulse. In one implementation, the emission scan driver 130 introduces the non-light-emitting region 201 while the emission pulse is appearing on the emission scan start pulse signal ESTV. The introduced non-light-emitting region 201 is then scrolled or shifted downward of the display panel 100 in synchronization with the emission scan clock ECK. The number of the non-light-emitting regions 201 in the display area 110 is controlled by the number of emission pulses that appear in the emission scan start pulse signal ESTV per frame period (which is defined by the display Vsync signal) while the width of the non-light-emitting regions 201 is controlled by the width of emission pulses. In one implementation, the number of the non-light-emitting regions 201 is equal to the number of the emission pulses per frame period and the width of the non-light-emitting regions are proportional to the width of the emission pulses. FIG. 2A shows the case where one emission pulse appears in the emission scan start pulse signal ESTV during each frame period while FIG. 2B shows the case where four emission pulses appear during each frame period. The display brightness level is lower as the number and/or width of non-light-emitting regions increases.

In an ideal operation (as shown in FIGS. 2A and 2B), the emission scan start pulse signal ESTV is generated in synchronization with the display Vsync signal such that emission pulses appear at regular time intervals with a fixed periodicity. If the emission pulses are not generated at regular time intervals, this may cause irregularity in the arrangement of the non-light-emitting regions 201, potentially resulting in a display image artifact.

Figure 2C:
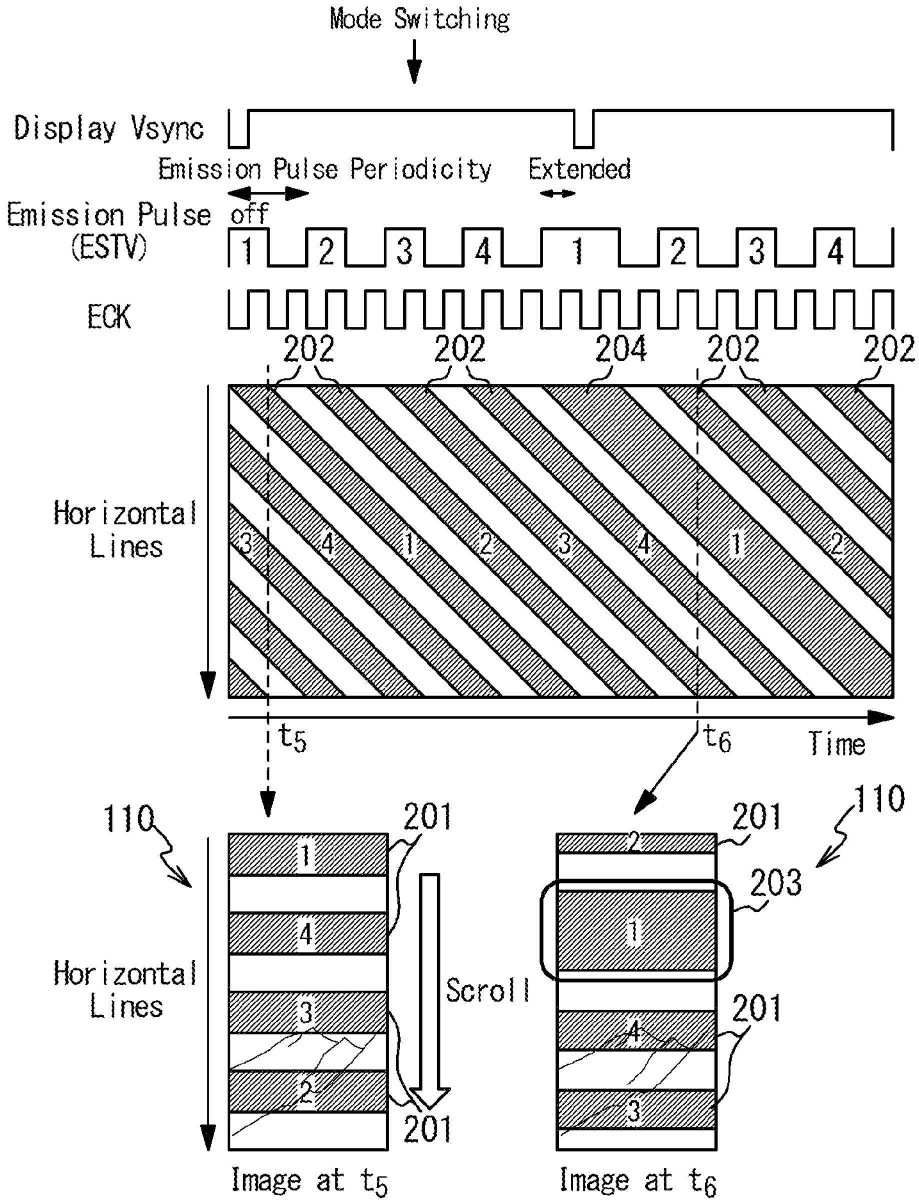
FIG. 2C shows an example display image artifact caused by disturbance in the periodicity of a display vertical sync signal caused by mode switching.

Mode switching (e.g., from the command mode to the video through mode) may generate irregularity in the emission pulses in the emission scan start pulse signal ESTV since the mode switching may disturb the periodicity of the display Vsync signal, which is used to generate the emission scan start pulse signal ESTV. FIG. 2C shows an example display artifact caused by the disturbance in the periodicity of the display Vsync signal caused by mode switching. In the shown operation, the timing at which the display Vsync signal is second asserted is delayed due to the mode switching. The delay in the assertion timing of the display Vsync signal causes irregularity in the emission pulses. In the shown operation, the pulse width of an emission pulse denoted by "1" in FIG. 2C is erroneously enlarged, and the enlarged pulse width causes an undesirably enlarged width of the corresponding non-light-emitting region, indicated by the numeral 203. The region 204 indicates that an increased number of horizontal lines belong to the enlarged non-light-emitting region 203. The undesired enlargement in the non-light-emitting region width may generate irregularity in the arrangement of the non-light-emitting regions, causing a display image artifact.

Figure 3:
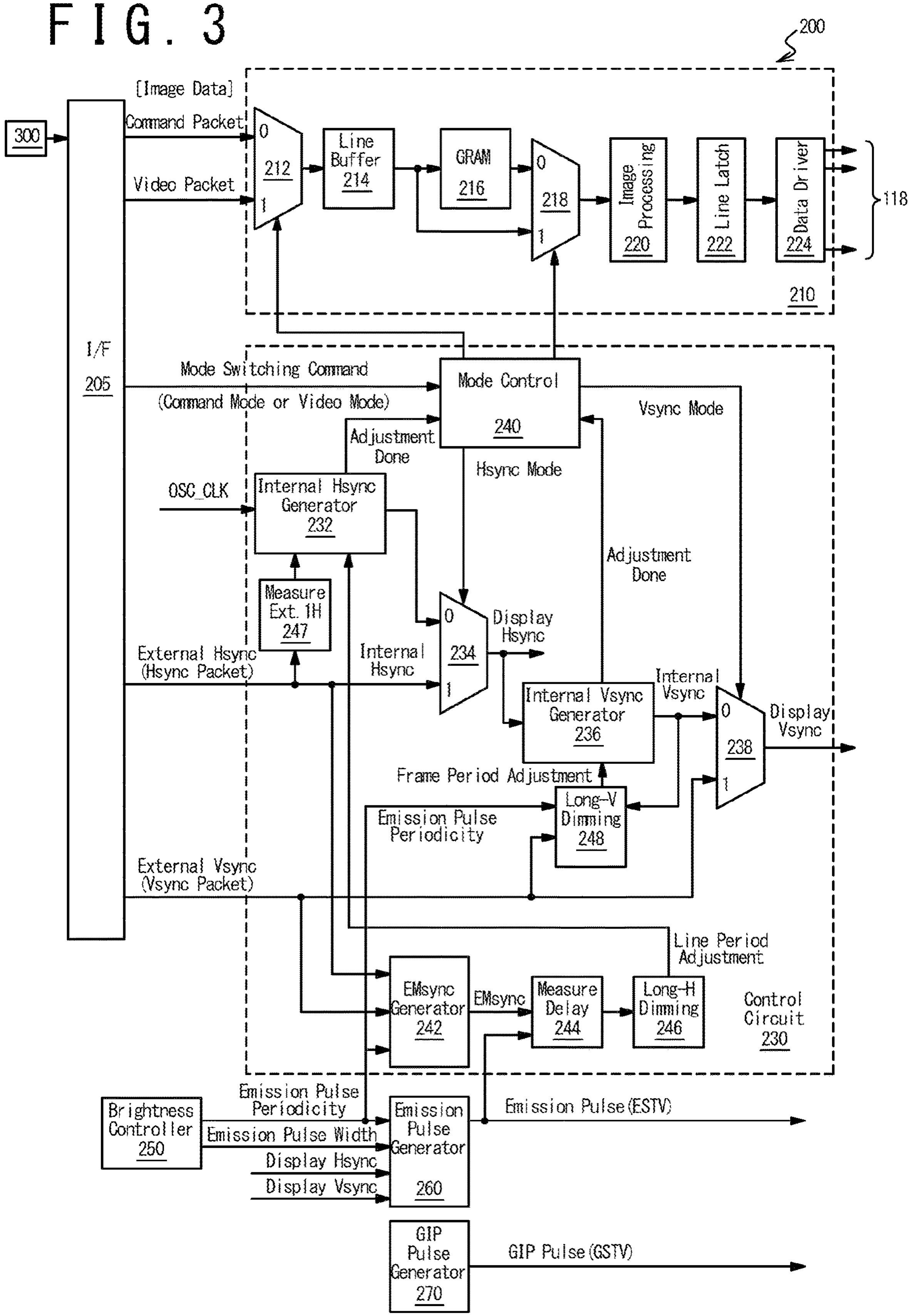
FIG. 3 shows an example configuration of a display driver, according to one or more embodiments.

FIG. 3 shows an example configuration of the display driver 200 adapted to mitigate display image artifacts potentially caused by mode switching, according to one or more embodiments. In the shown embodiment, the display driver 200 includes an interface (I/F) circuit 205, a drive circuitry 210, a control circuit 230, a brightness controller 250, an emission pulse generator 260, and a gate in panel (GIP) pulse generator 270.

The interface circuit 205 is configured to receive image data from the external source 300 and forward the received image data to the drive circuitry 210. The image data may be transferred to the display driver 200 in the form of commands or video packets as described in relation to FIG. 1. The interface circuit 205 is further configured to receive various commands from the external source 300. The commands received from the external source 300 may include a mode switching command. The display driver 200 is configured to switch the operation mode in response to the mode switching command as discussed later in detail.

The interface circuit 205 is further configured to generate an external vertical sync (Vsync) signal and an external horizontal sync (Hsync) signal based at least in part on the external sync control inputs received from the external source 300. In embodiments where the external sync control inputs include Vsync packets and Hsync packets, the interface circuit 205 may be configured to generate the external Vsync signal in synchronization with the Vsync packets and generate the external Hsync signal in synchronization with the Hsync packets. The external Vsync signal and external Hsync signal are provided to the control circuit 230. In other embodiments, the external sync control inputs may include an external Vsync signal and an external Hsync signal. In this case, the interface circuit 205 forwards the external Vsync signal and the external Hsync signal to the control circuit 230.

The drive circuitry 210 is configured to update or program the display elements 112 of the display panel 100 based at least in part on the image data received from the external source 300 via the interface circuit 205. In the shown embodiment, the drive circuitry 210 include a selector 212, a line buffer 214, a graphic random access memory (GRAM) 216, a selector 218, an image processing circuit 220, a line latch 222, and a data driver 224. The selector 212 is configured to selectively forward the commands or video packets, which are received from the external source 300, to the line buffer 214. The line buffer 214 is configured to store image data for one horizontal line of the display panel 100 and forward the stored image data to the GRAM 216. The GRAM 216 is configured to store image data for one frame image to be displayed on the display panel 100. The image data stored in the GRAM 216 is successively updated with the image data received from the line buffer 214. The selector 218 is configured to selectively couple the output of the line buffer 214 or the output of the GRAM 216 to the image processing circuit 220 depending on the operation mode of the display driver 200. The image processing circuit 220 is configured to process image data received from the line buffer 214 or the GRAM 216 and provide the processed image data to the line latch 222. The line latch 222 is configured to latch the processed image data from the image processing circuit 220 in units of horizontal lines and forward the processed image data to the data driver 224. The data driver 224 is configured to update or program the display elements 112 of the display panel 100 based at least in part on the processed image data. In one implementation, the processed image data may include graylevels of the respective display elements 112 and the data driver 224 may be configured to update or program the display elements 112 with data voltages corresponding to the graylevels the respective display elements 112.

The control circuit 230 is configured to generate the display vertical sync (Vsync) signal and the display horizontal sync (Hsync) signal, which are used for timing control in the display driver 200. The display Vsync signal defines frame periods (or vertical sync periods) and the display Hsync signals defines line periods (or horizontal sync periods). In one or more embodiments, the control circuit 230 is configured to generate an internal Hsync signal based on an internal oscillator clock OSC_CLK generated by an internal oscillator (not shown) disposed in the display driver 200 and select the display Hsync signal from between the internal Hsync signal and the external Hsync signal. The control circuit 230 is further configured to generate an internal Vsync signal based on the display Hsync signal and select the display Vsync signal from between the internal Vsync signal and the external Vsync signal. Details of the configuration and operation of the control circuit 230 will be describe later.

The brightness controller 250 is configured to control the display brightness level of the display device 1000. As discussed in relation to FIGS. 2A and 2B, the display brightness level is controllable with widths of emission pulses carried by the emission scan start pulse signal ESTV and the number of the emission pulses per frame period (or per vertical sync period). In one implementation, the brightness controller 250 is configured to determine the periodicity of emission pulses and the widths of the emission pulses in accordance with a target display brightness level.

The emission pulse generator 260 is configured to generate the emission scan start pulse signal ESTV, which carries emission pulses, using the display Vsync signal and the display Hsync signal received from the control circuit 230. The emission scan start pulse signal ESTV is generated such that the emission pulses have periodicity and pulse widths as indicated by the brightness controller 250.

The GIP pulse generator 270 is configured to generate the gate scan start pulse signal GSTV using the display Vsync signal and the display Hsync signal. As described in relation to FIG. 1, the gate scan start pulse signal GSTV is used to control the gate scan driver 120.

In the following, a description is given of details of the control circuit 230. In the shown embodiment, the control circuit 230 includes an internal Hsync generator 232, a selector 234, an internal Vsync generator 236, a selector 238 and a display mode controller 240. The internal Hsync generator 232 is configured to generate an internal Hsync signal using an internal oscillator clock OSC_CLK generated by an internal oscillator (not shown) disposed in the display driver 200. In one implementation, the internal Hsync signal may be generated by counting the internal oscillator clock OSC_CLK. The selector 234 is configured to select the display Hsync signal from between the internal Hsync signal and the external Hsync signal. The selection of the display Hsync signal is based on an Hsync mode signal received from the display mode controller 240. The internal Vsync generator 236 is configured to generate an internal Vsync signal using the display Hsync signal. In one implementation, the internal Vsync signal may be generated by counting the display Hsync signal. The selector 238 is configured to select the display Vsync signal from between the internal Vsync signal and the external Vsync signal. The selection of the display Vsync signal is based on a Vsync mode signal received from the display mode controller 240.

In the shown embodiment, the control circuit 230 further includes an emission synchronization (EMsync) generator 242, a delay measurement circuit 244, a long-H dimming circuit 246, an external 1H measurement circuit 247, and a long-V dimming circuit 248. The emission synchronization (EMsync) generator 242, the delay measurement circuit 244, the long-H dimming circuit 246, the external 1H measurement circuit 247, and the long-V dimming circuit 248 are collectively configured to control the internal Hsync generator 232 and the internal Vsync generator 236 to adjust the internal Hsync signal and the internal Vsync signal (and thereby adjust the display Hsync signal and the display Vsync signal).

The EMsync generator 242 is configured to generate an emission synchronization signal EMsync using the external Vsync signal and the external Hsync signal. In one implementation, the EMsync generator 242 is configured to generate the emission synchronization signal EMsync such that the emission synchronization signal is synchronous with the external vertical sync signal and has the same periodicity as the periodicity of the emission pulses, which is determined by the brightness controller 250.

The delay measurement circuit 244 is configured to measure the delay between an assertion of the display Vsync signal and an assertion of the emission synchronization signal. In some embodiments, the delay measurement circuit 244 is configured to measure the delay from an assertion of the display Vsync signal and a subsequent assertion of the emission synchronization signal. In other embodiments, the delay measurement circuit 244 is configured to measure the delay from an assertion of the emission synchronization signal to a subsequent assertion of the display Vsync signal.

The long-H dimming circuit 246 is configured to perform "long-H dimming" based on the delay measured by the delay measurement circuit 244. The "long-H dimming" referred herein is a process to synchronize the display Vsync signal with the emission synchronization signal EMsync by adjusting the internal Hsync signal (and thereby adjusting the display Hsync signal). The time interval of two consecutive assertions of the display Vsync signal corresponds to the duration of the frame period (or vertical sync period) defined by the two consecutive assertions while the frame period includes a plurality of line periods (or horizontal sync periods). As the periodicity of the display Hsync signal corresponds to the duration of line periods (or horizontal sync periods), the duration of a frame period is adjustable by adjusting the display Hsync signal. In one implementation, the "long-H dimming" extends a predetermined number of frame periods by adjusting the display Hsync signal to synchronize the display Vsync signal with the synchronization signal EMsync.

The external 1H measurement circuit 247 is configured to measure the periodicity of the external Hsync signal received from the interface circuit 205 (or the time interval between two consecutive assertions of the external Hsync signal). The internal Hsync generator 232 is configured to adjust the internal Hsync signal based on the measured periodicity of the external Hsync signal such that the internal Hsync signal has the same periodicity as the external Hsync signal.

The long-V dimming circuit 248 is configured to perform "long-V dimming" based on the external Vsync signal and the internal Vsync signal. The "long-V dimming" is a process to synchronize the display Vsync signal with the external Vsync signal by adjusting the internal Vsync signal (and thereby adjusting the display Vsync signal). The synchronization of the display Vsync signal with the external Vsync signal is achieved by extending one or more frame periods in increments of the periodicity of emission pulses.

Figure 4:
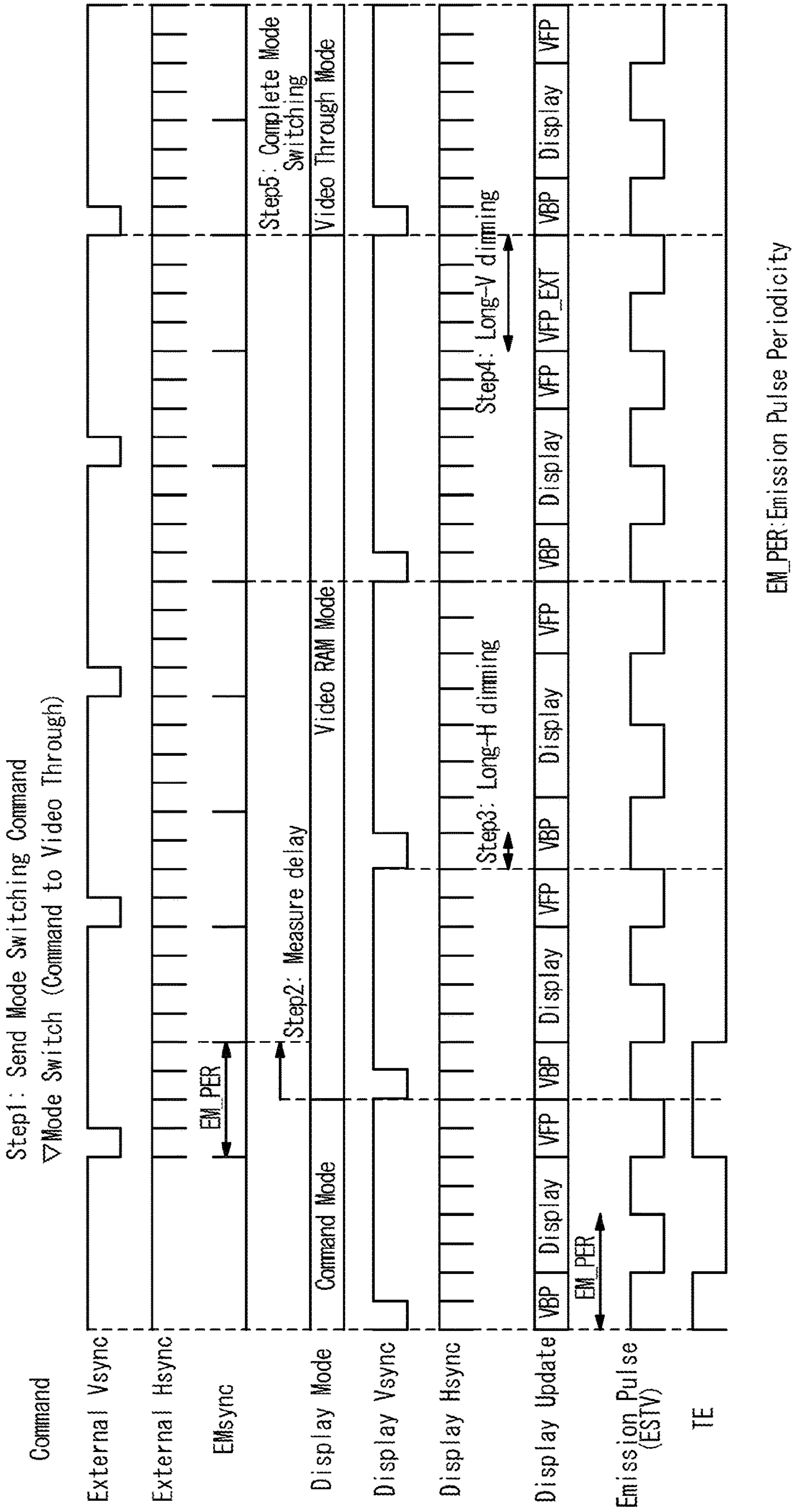
FIG. 4 shows an example operation of a display driver, according to one or more embodiments.
Figure 5A:
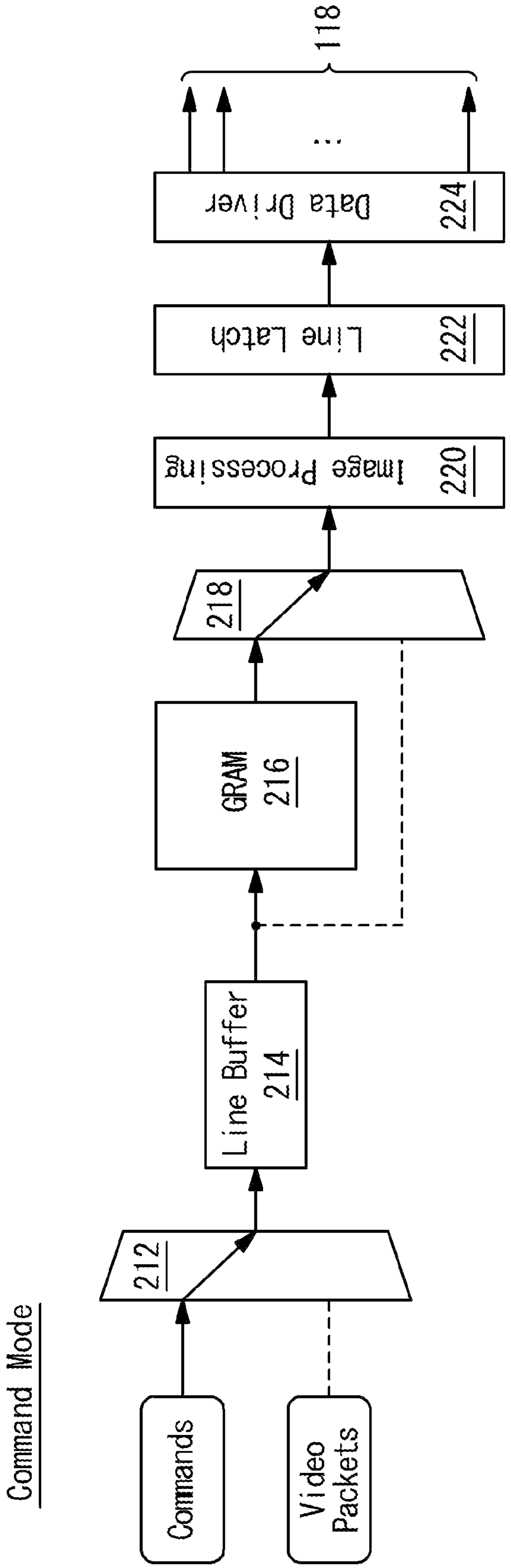
FIG. 5A shows an example operation of a display driver in a command mode, according to one or more embodiments.

FIG. 4 shows an example overall operation of the display driver 200 of FIG. 3 in mode switching from the command mode to the video through mode, according to one or more embodiments. In the shown embodiment, the display driver 200 is initially in the command mode. In the command mode, as shown in FIG. 5A, one or more commands that carry image data are transferred from the external source 300 to the display driver 200. It is noted that no external sync control inputs (e.g., Vsync packets and Hsync packets) are provided to the display driver 200 in the command mode and the display driver 200 generates the display Vsync signal and the display Hsync signal without using the external sync control inputs (e.g., by using the oscillator clock OSC_CKL generated in the display driver 200). The internal Vsync signal and the internal Hsync signal are selected as the display Vsync signal and the display Hsync signal, respectively, in the command mode. The received commands are forwarded to the GRAM 216 via the selector 212 and the line buffer 214, and the GRAM 216 stores therein image data carried by the commands. The image data stored in the GRAM 216 is forwarded to the image processing circuit 220 via the selector 218 and processed by the image processing circuit 220. The processed image data is forwarded to the data driver 224 via the line latch 222 and the display elements 112 of the display panel 100 are updated (or programed) by the data driver 224 based on the processed image data.

Figure 6A:
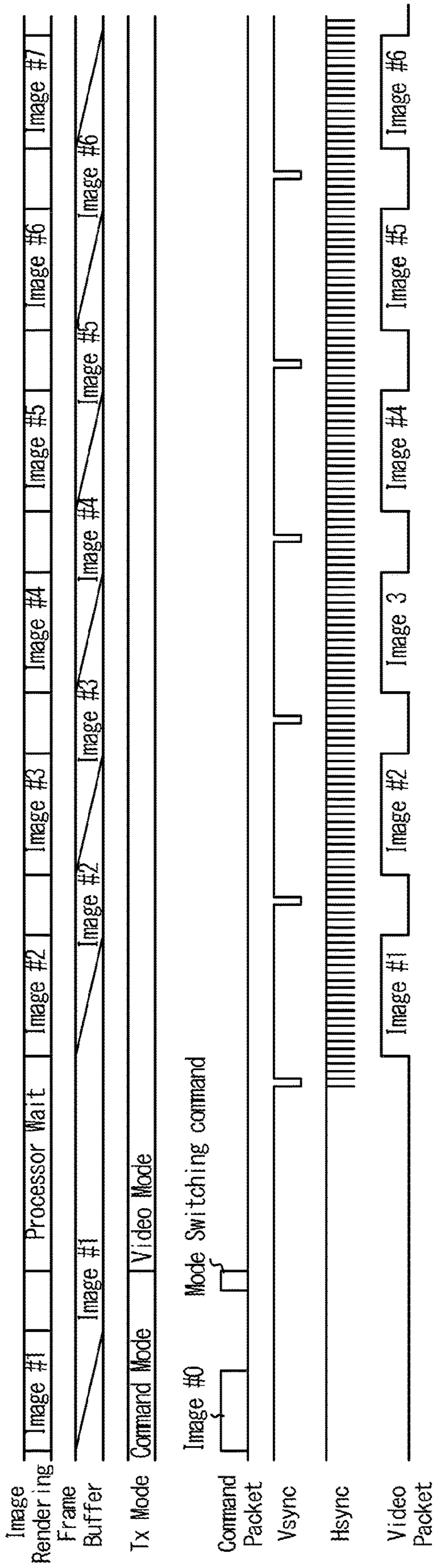
FIG. 6A shows an example operation of an external source configured to provide image to a display driver, according to one or more embodiments.

Referring back to FIG. 4, at step 1, the external source 300 sends a mode switching command that instructs the display driver 200 to go into the video through mode. The external source 300 then starts providing video packets and external sync control inputs to the display driver 200 (also shown in FIG. 6A). The video packets carry image data for every frame period and the display driver 200 updates the display elements 112 of the display panel 100 every frame period based on the image data carried by the video packets. The external sync control inputs may include Vsync packets and Hsync packets as discussed in relation to FIG. 3.

As shown in FIG. 4, the display driver 200 is configured to go into a "video RAM mode" in response to reception of the mode switching command before going into the video through mode. During the "video RAM mode", the display driver 200 uses the GRAM 216 to provide the image data to the data driver 224 while adjusting the display Vsync signal to synchronize the display Vsync signal with the external Vsync signal generated based on the external sync control inputs (which may include Vsync packets and/or Hsync packets). The display driver 200 is further configured to go into the video through mode upon achieving synchronization of the display Vsync signal with the external Vsync signal.

Figure 5B:
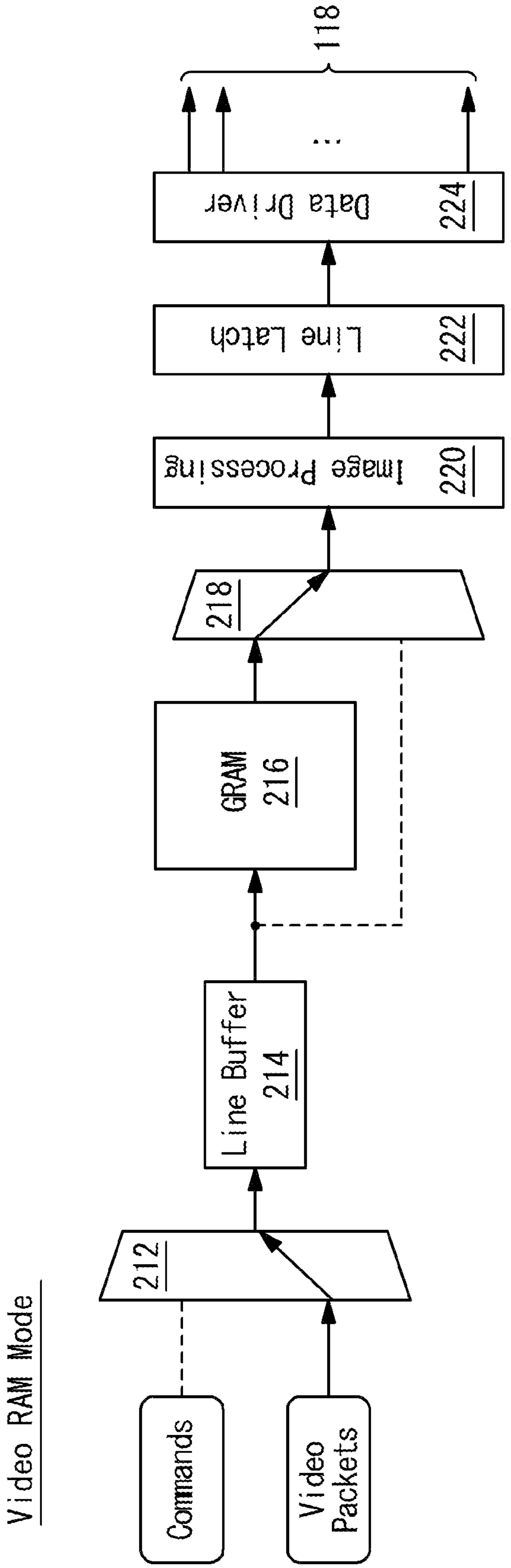
FIG. 5B shows an example operation of a display driver in a video random access memory (RAM) mode, according to one or more embodiments.

FIG. 5B shows an example operation of the display driver 200 in the video RAM mode, according to one or more embodiments. In the video RAM mode, the display driver 200 receives video packets from the external source 300. The video packets are forwarded to the GRAM 216 via the selector 212 and the line buffer 214, and the GRAM 216 stores therein image data carried by the video packets. The image data stored in the GRAM 216 is forwarded to the image processing circuit 220 via the selector 218 and processed by the image processing circuit 220. The processed image data is forwarded to the data driver 224 via the line latch 222 and the display elements 112 of the display panel 100 are updated (or programed) by the data driver 224 based on the processed image data.

Referring back to FIG. 4, in one or more embodiments, the adjustment of the display Vsync signal during the video RAM mode includes steps 2, 3 and 4 as discussed in the following. At step 2, the delay between an assertion of the display Vsync signal and an assertion of the emission synchronization signal EMsync is measured (e.g., by the delay measurement circuit 244 shown in FIG. 3). It is noted that, in FIG. 4 (and other figures), the display Vsync signal and the display Hsync signal are shown as being asserted when pulled down to the low level while the emission synchronization signal EMsync is shown as being asserted when pulled up to the high level. As discussed in relation to FIG. 3, the emission synchronization signal EMsync is synchronous with the external Vsync signal and has the same periodicity as the periodicity (indicated by EM_PER in FIG. 4) of the emission pulses carried by the emission scan start pulse signal ESTV. In the shown embodiment, the delay from an assertion of the display Vsync signal to a subsequent assertion of the emission synchronization signal EMsync is measured.

At step 3, the "long-H dimming" process is performed to compensate the delay measured at step 2. As discussed in relation to FIG. 3, the "long-H dimming" process synchronizes the display Vsync signal with the emission synchronization signal EMsync by adjusting the internal Hsync signal (and thereby adjusting the display Hsync signal). It is noted that the internal Vsync signal and the internal Hsync signal are selected as the display Vsync signal and the display Hsync signal, respectively, during the "long-H dimming" process. In one implementation, the long-H dimming extends one or more frame periods by decreasing the frequency of the internal Hsync signal (or increasing durations of line periods defined by the internal Hsync signal). In embodiments where two or more frame periods are extended by the long-H dimming, the extension amounts assigned to the extended frame periods are determined based on the delay measured at step 2. In one implementation, the sum of the extension amounts is equal to the delay from an assertion of the display Vsync signal to a subsequent assertion of the emission synchronization signal EMsync. When the "long-H dimming" process is completed as desired, the timing skew between the display Vsync signal and the external Vsync signal is the same as the periodicity of the emission pulses or a multiple of periodicity of the emission pulses.

At step 4, the "long-V dimming" process is performed. As discussed in relation to FIG. 3, the "long-V dimming" process synchronizes the display Vsync signal with the external Vsync signal by adjusting the internal Vsync signal to extend one or more frame periods in increments of the periodicity of the emission pulses. It is noted that, during the "long-V dimming" process, the internal Vsync signal is selected as the display Vsync signal while the external Hsync signal is are selected as the display Hsync signal. In some embodiments, a vertical front porch (VFP) period(s) of the one or more frame periods are extended during the "long-V dimming" process. In FIG. 4, the extended portion of the vertical front porch period of the extended frame period is indicated by "VFP_EXT."

At step 5, which follows step 4, the display driver 200 goes into the video through mode to complete the mode switching. In the video through mode, the external Vsync signal is selected as the display Vsync signal and the emission scan start pulse signal ESTV, which carries emission pulses, is generated in synchronization with the external Vsync signal.

Figure 5C:
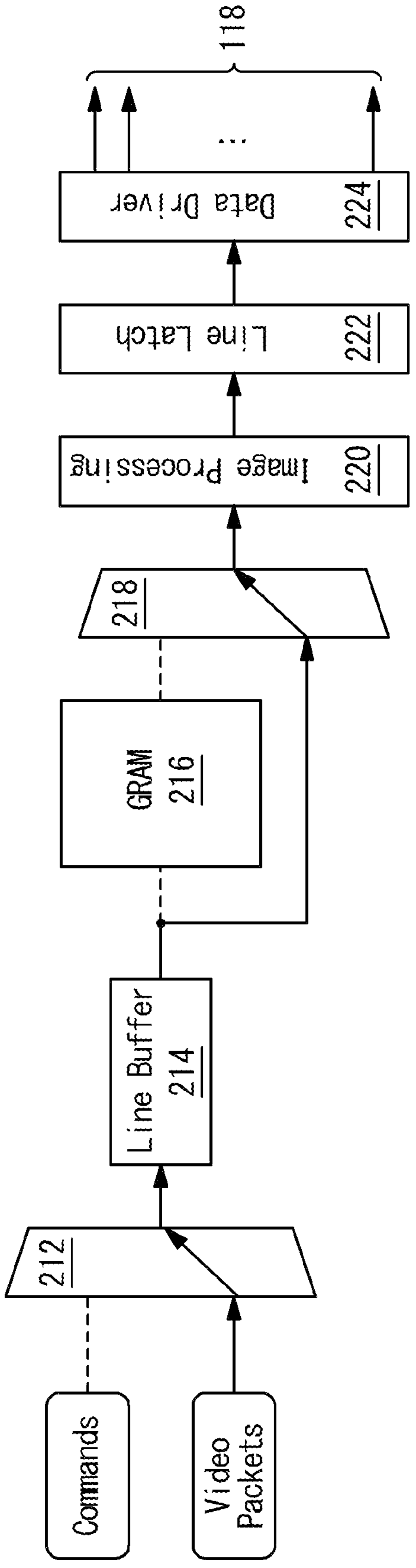
FIG. 5C shows an example operation of a display driver in a video through mode, according to one or more embodiments.

FIG. 5C shows an example operation of the display driver 200 in the video through mode, according to one or more embodiments. In the video through mode, the image data carried by the video packets is transferred to the data driver 224, bypassing the GRAM 216, and the GRAM 216 is deactivated to reduce power consumption. More specifically, the video packets received from the external source 300 are forwarded to the image processing circuit 220 via the selector 212, the line buffer 214, and the selector 218. The image processing circuit 220 processes the image data carried by the video packets. The processed image data is forwarded to the data driver 224 via the line latch 222 and the display elements 112 of the display panel 100 are updated (or programed) by the data driver 224 based on the processed image data.

Figure 6B:
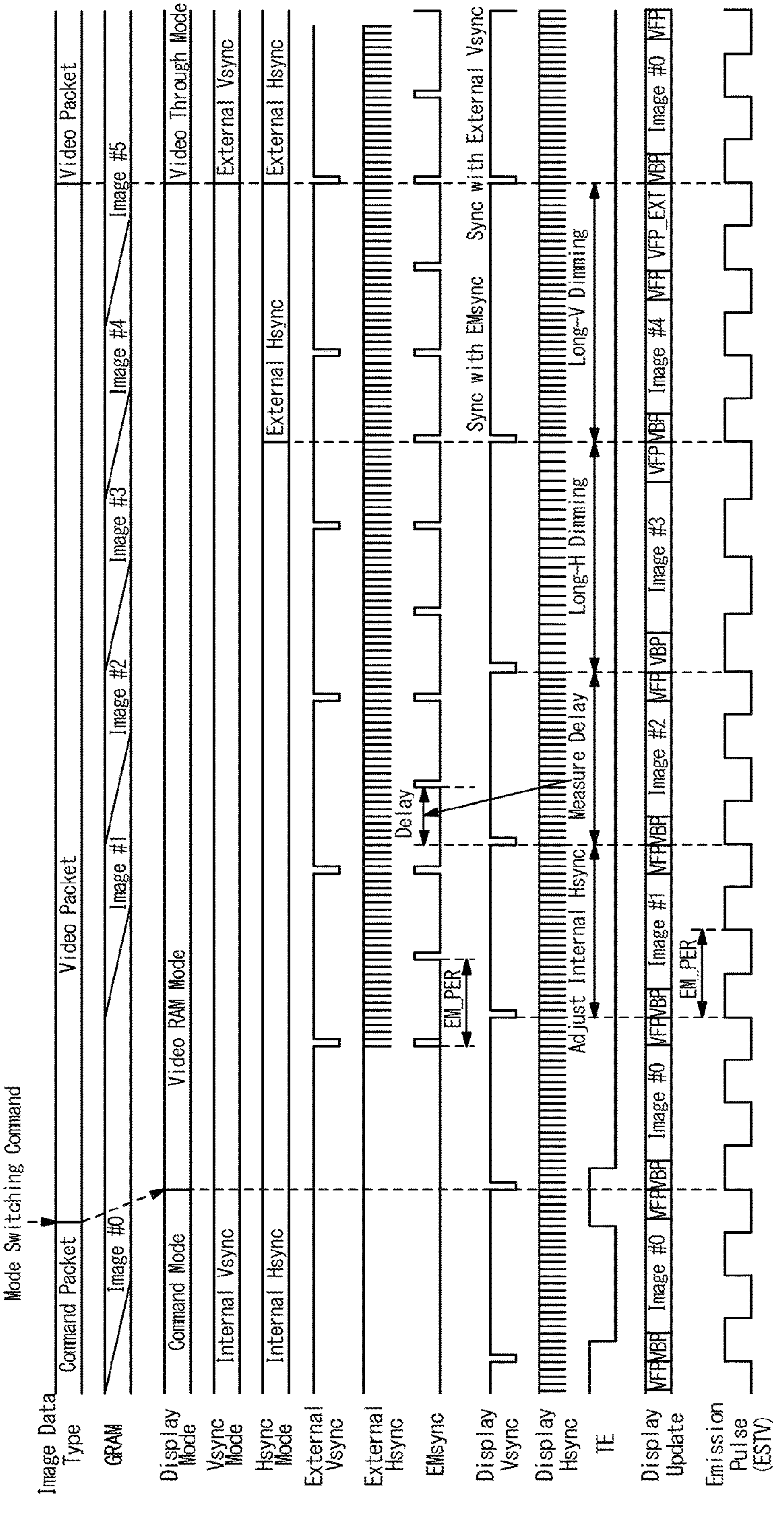
FIG. 6B shows a detailed example operation of a display driver after receiving a mode switching command, according to one or more embodiments.

FIG. 6B shows a detailed example operation of the display driver 200 after receiving the mode switching command, according to one or more embodiments. In the shown embodiment, the display driver 200 starts generating the external Vsync signal and the external Hsync signal in response to the external sync control inputs (e.g., Vsync packets and Hsync packets) and further starts generating the emission synchronization signal EMsync. In embodiments where the display driver 200 is configured as shown in FIG. 3, the external Vsync signal and the external Hsync signal are generated by the interface circuit 205 and the emission synchronization signal EMsync is generated by the EMsync generator 242. It is noted however that the display driver 200 still selects the internal Vsync signal as the display Vsync signal and the internal Hsync signal as the display Hsync signal just after the reception of the mode switching command.

Figure 7:
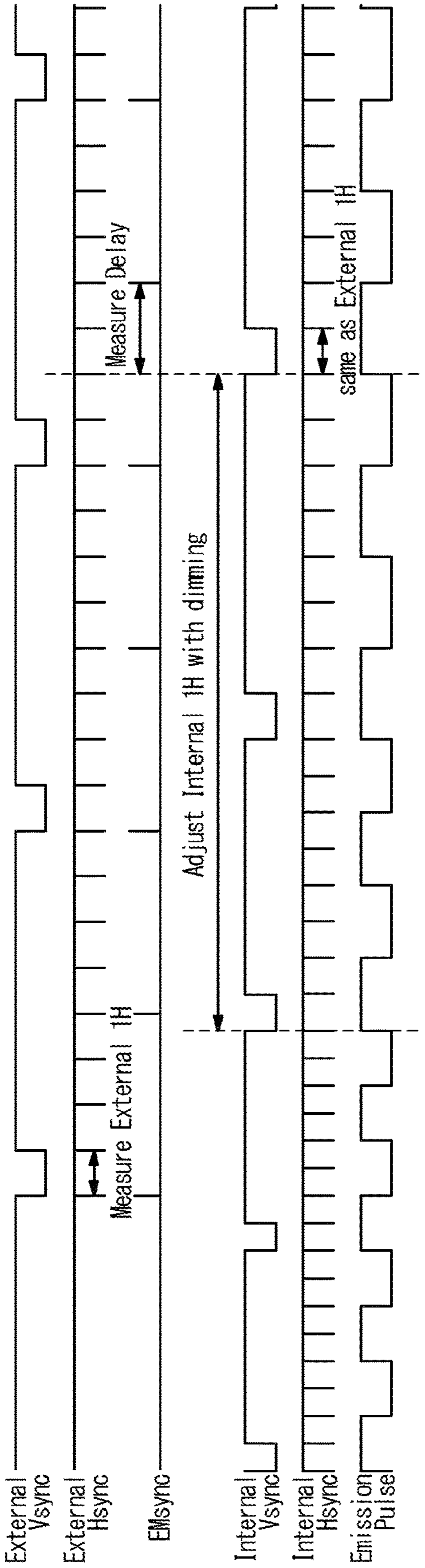
FIG. 7 shows an example adjustment process of an internal horizontal sync (Hsync) signal, according to one or more embodiments.

The display driver 200 further adjusts the internal Hsync signal such that the internal Hsync signal has the same periodicity as the external Hsync signal. FIG. 7 shows an example adjustment process of the internal Hsync signal, according to one or more embodiments. The adjustment of the internal Hsync signal begins with measuring the periodicity of the external Hsync signal (which is indicated as "External 1H" in FIG. 7). In embodiments where the display driver 200 is configured as shown in FIG. 3, the external 1H measurement circuit 247 measures the periodicity of the external Hsync signal.

The internal Hsync signal is then adjusted based on the measured periodicity of the external Hsync signal to have the same periodicity as the external Hsync signal. In embodiments where the display driver 200 is configured as shown in FIG. 3, the internal Hsync generator 232 adjusts the internal Hsync signal based on the measured periodicity of the external Hsync signal. In one implementation, the periodicity of the internal Hsync signal is adjusted with a "dimming" scheme in which the periodicity of the internal Hsync signal is gradually changed to the periodicity of the external Hsync signal. The "dimming" scheme avoids an abrupt change in the periodicity of the internal Hsync signal, mitigating display image artifacts potentially caused by a change in the internal Hsync signal.

Referring back to FIG. 6B, after the adjustment of the internal Hsync signal is completed, the delay between an assertion of the display Vsync signal and an assertion of the emission synchronization signal EMsync is measured as discussed in relation to FIG. 4. In the shown embodiment, the delay from an assertion of the display Vsync signal to a subsequent assertion of the emission synchronization signal EMsync is measured.

The "long-H dimming" process is then performed to synchronize the display Vsync signal with the emission synchronization signal EMsync by adjusting the internal Hsync signal, which is used to generate the display Hsync signal and the display Vsync signal at this stage. As discussed in relation to FIG. 4, the "long-H dimming" process is based on the delay between the assertion of the display Vsync signal and the assertion of the emission synchronization signal EMsync. In one or more embodiments, the "long-H dimming" is achieved by extending one or more frame periods by temporarily increasing the periodicity of the internal Hsync signal (and the periodicity of the display Hsync signal).

In some embodiments, two or more frame periods are extended during the "long-H dimming" process to achieve the synchronization of the display Vsync signal with the emission synchronization signal EMsync. In such embodiments, extension amounts of the two or more frame periods are determined based on the delay between an assertion of the display Vsync signal and a subsequent assertion of the emission synchronization signal EMsync. The extension amount is the amount of time in which the corresponding frame period is extended. In one implementation, the "long-H dimming" process includes assigning extension amounts to the two or more extended frame periods such that the sum of the extension amounts of the extended frame periods is equal to the delay between the assertion of the display Vsync signal to the subsequent assertion of the emission synchronization signal EMsync. Extension amounts that are assigned to frame periods may be referred to as assigned extension amounts.

Figure 8A:
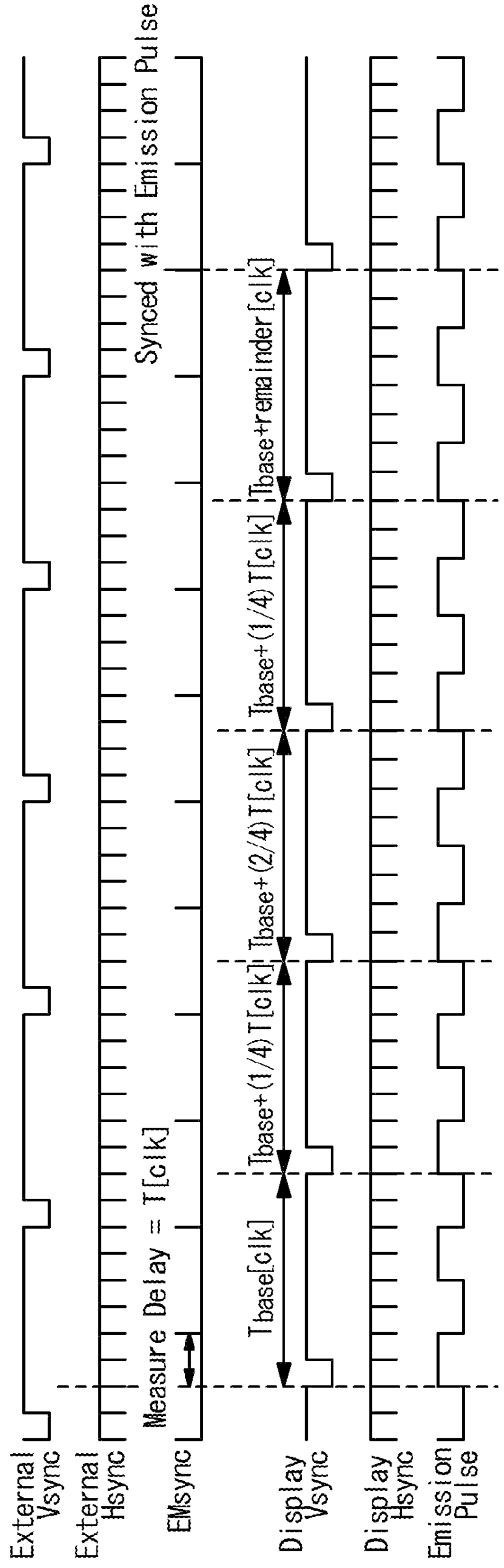
FIG. 8A shows an example "long-H dimming" process, according to one or more embodiments.

FIG. 8A shows an example "long-H dimming" process, according to one or more embodiments. In the shown embodiment, four frame periods are extended after the measurement of the delay between an assertion of the display Vsync signal and a subsequent assertion of the emission synchronization signal EMsync. In FIG. 8A, "Tbase" indicates a nominal duration of a frame period and "T" indicates the delay between the assertion of the display Vsync signal and the subsequent assertion of the emission synchronization signal EMsync. In the shown embodiment, the nominal duration of a frame period "Tbase", the delay "T", and the extension amounts assigned to the extended frame periods are each measured as the number of clocks contained therein, as indicated by the notation "[clk]". For example, the nominal duration of a frame period is measured as Tbase clocks is indicated as Tbase [clk] in FIG. 8A.

Figure 9A:
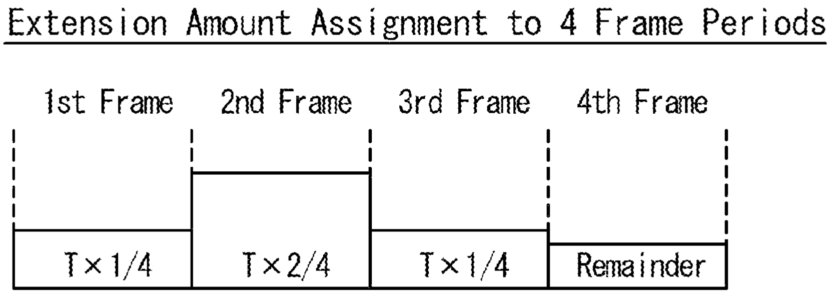
FIGS. 9A, 9B, and 9C show example assignment of extension amounts to extended frame periods, according to one or more embodiments.

FIG. 9A shows an example assignment of extension amounts to the four extended frame periods, according to one or more embodiments. The extension amounts are assigned to the four extended frame periods such that the frame period duration first increases stepwise and then decreases stepwise. More specifically, the extension amount assigned to the second one of the four extended frame periods is longer than the extension amount assigned to the first one of the four extended frame periods while the extension amount assigned to the third one of the four extended frame periods is shorter than the extension amount assigned to the second one of the four extended frame periods. In the shown embodiment, the extension amount assigned to the first one of the four extended frame periods is $T\times(1/4)$ (more strictly, the integer part of $T\times(1/4)$) clocks, the extension amount assigned to the second one is $T\times(2/4)$ clocks, and the extension amount assigned to the third one is $T\times(1/4)$ clocks. The extension amount assigned to the fourth one of the four extended frame periods is the remainder when T is divided by 4. The extension amount assignment in which the frame period duration first increases stepwise and then decreases stepwise suppresses the change in the frame period duration between two consecutive frame periods, and thereby reduces changes in the periodicity of the display Hsync signal during the "long-H dimming" process. The reduction in the changes in the periodicity of the display Hsync signal may mitigate display image artifacts potentially caused by the changes in periodicity of the display Hsync signal.

Figure 8B:
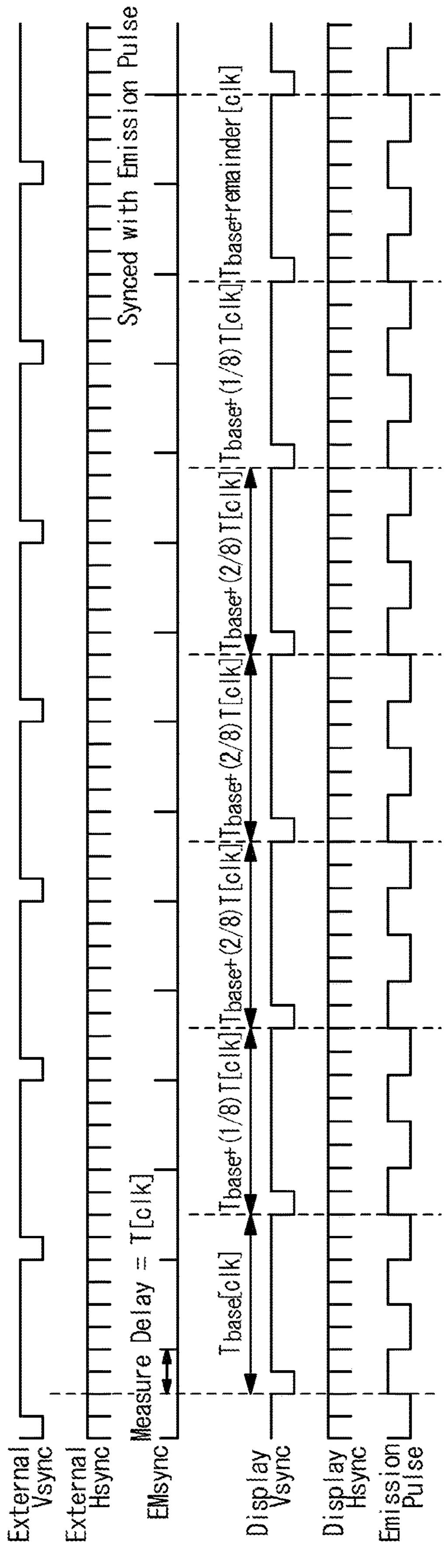
FIG. 8B shows another example "long-H dimming" process, according to one or more embodiments.
Figure 9B:
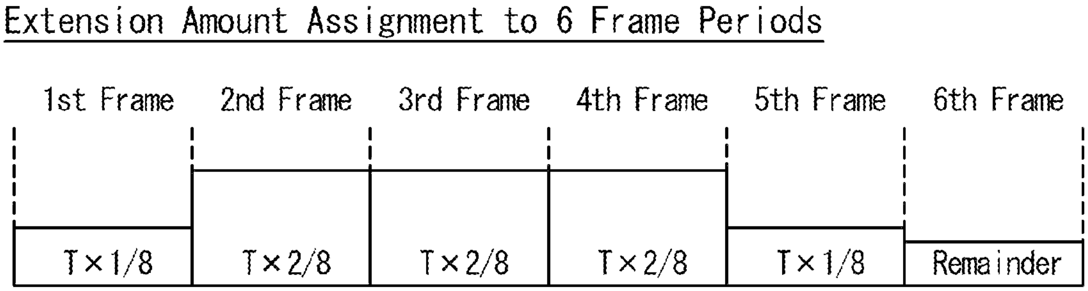
Figure 9C:
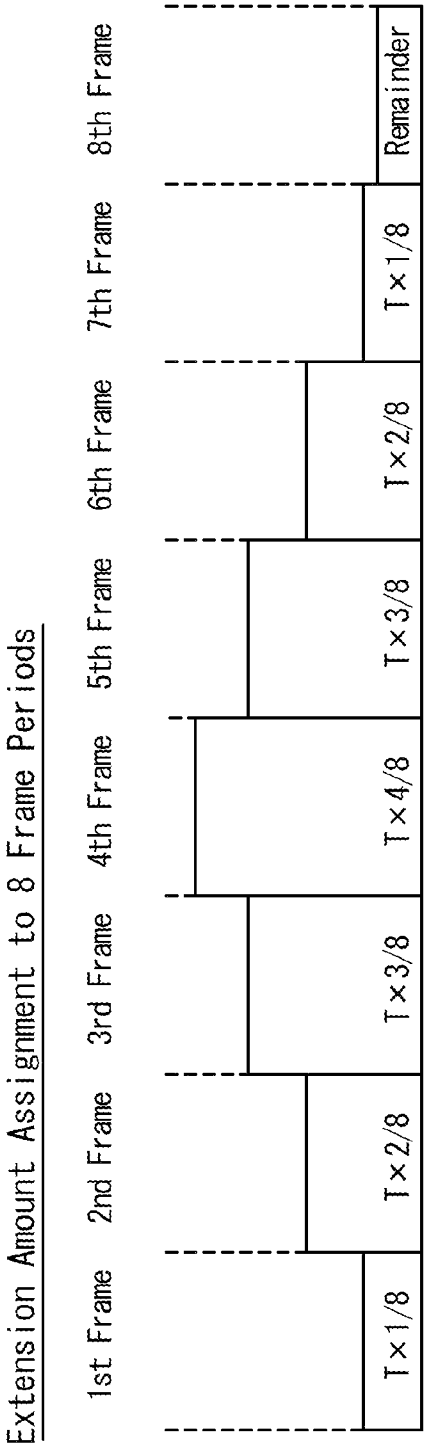

The number of extended frame periods during the "long-H dimming" process may be variously modified, not limited to four. FIG. 8B shows another example "long-H dimming" process, according to one or more embodiments. In the shown embodiment, six frame periods are extended after the measurement of the delay between an assertion of the display Vsync signal and a subsequent assertion of the emission synchronization signal EMsync. FIG. 9B shows an example assignment of extension amounts to the six extended frame periods, according to one or more embodiments. The extension amounts are assigned to the six extended frame periods such that the frame period duration first increases stepwise and then decreases stepwise as is the case with FIG. 9A. More specifically, the extension amount assigned to the second, third, fourth ones of the six extended frame periods are longer than the first one of the six extended frame periods while the extension amount assigned to the fifth one of the six extended frame periods is shorter than the extension amount to the second, third, and fourth ones of the six extended frame periods. In the shown embodiment, the extension amount assigned to the first one of the six extended frame periods is $T\times(1/8)$ (more strictly, the integer part of $T\times(1/8)$) clocks, the extension amount assigned to the second, third, and fourth ones is $T\times(2/8)$ clocks, and the extension amount assigned to the fifth one is $T\times(1/8)$ clocks. The extension amount assigned to the sixth one of the six extended frame periods is the remainder when T is divided by 8. Further, FIG. 9C shows an example assignment of extension amounts in embodiments where the number of extended frame periods is eight. Also, in the embodiment shown in FIG. 9C, the extension amounts are assigned to the eight extended frame periods such that the frame period duration first increases stepwise and then decreases stepwise.

Referring back to FIG. 6B, the "long-H dimming" process is followed by the "long-V dimming" process, which synchronizes the display Vsync signal with the external Vsync signal by adjusting the internal Vsync signal, which is used to generate the display Vsync signal at this stage. It is noted that the display Hsync signal is switched from the internal Hsync signal to the external Hsync signal upon the transition to the "long-V dimming" process. As discussed in relation to FIG. 3, the "long-V dimming" process synchronizes the display Vsync signal with the external Vsync signal by adjusting the internal Vsync signal to extend one or more frame periods in increments of the periodicity of the emission pulses. In some embodiments, a vertical front porch (VFP) period(s) of the one or more frame periods are extended during the "long-V dimming" process. In FIG. 6B, the extended portion of the vertical front porch period of the extended frame period is indicated by "VFP_EXT."

Figure 10A:
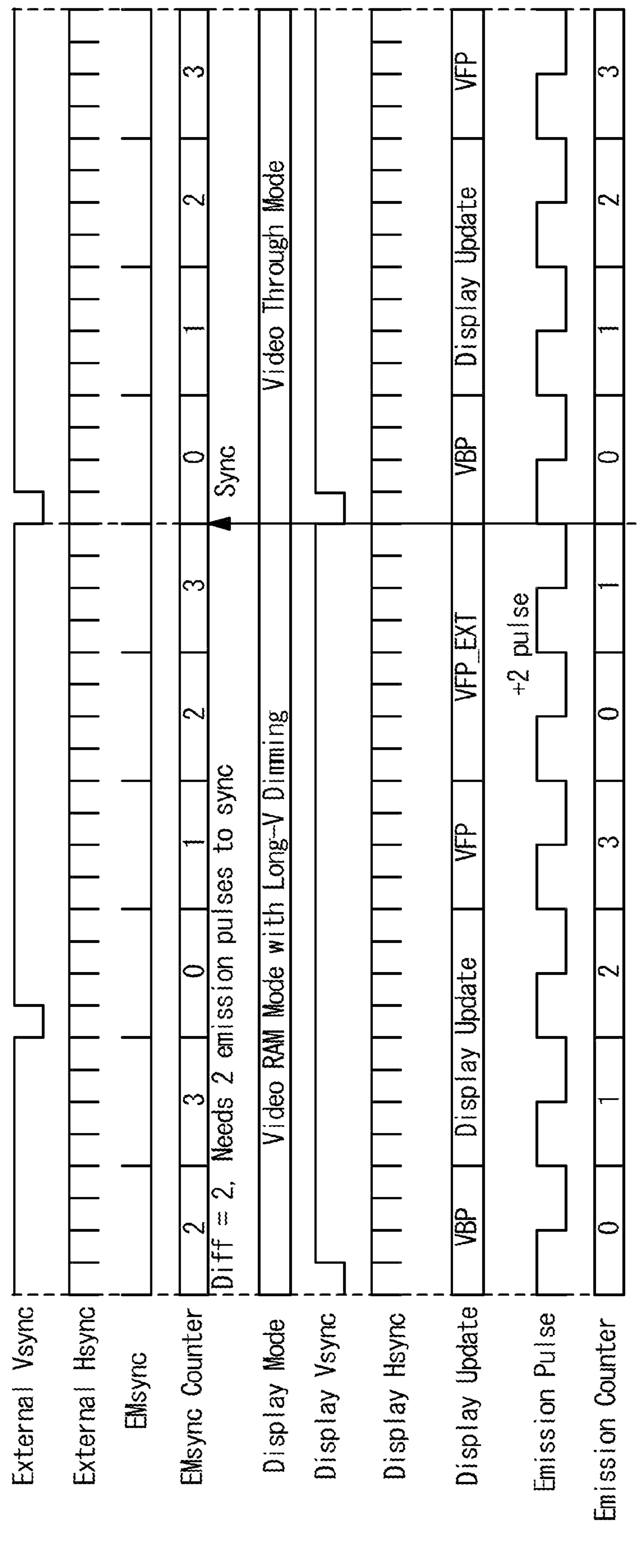
FIG. 10A shows an example "long-V dimming" process, according to one or more embodiments.

FIG. 10A shows an example "long-V dimming" process, according to one or more embodiments. When the "long-H dimming" process is completed as desired, the timing skew between the display Vsync signal and the external Vsync signal is the same as the periodicity of the emission pulses or a multiple of the periodicity of the emission pulses. Accordingly, it is possible to synchronizes the display Vsync signal with the external Vsync signal by extending one or more frame periods in increments of the periodicity of the emission pulses. In the shown embodiment, the timing skew between the display Vsync signal and the external Vsync signal is twice of the periodicity of the emission pulses.

In one or more embodiments, the "long-V dimming" process begins with determining the timing skew between the display Vsync signal and the external Vsync signal. In one implementation, the timing skew between the display Vsync signal and the external Vsync signal may be determined based on a count value of an EMsync counter configured to count assertions of the emission synchronization signal EMsync and a count value of an emission counter configured to count emission pulses carried by the emission scan start pulse signal ESTV. The EMsync counter may be disposed in the EMsync generator 242 (shown in FIG. 3) and configured to be reset upon an assertion of the external Vsync signal and then count up upon each assertion of the emission synchronization signal EMsync. The emission counter may be disposed in the emission pulse generator 260 (shown in FIG. 3) and configured to be reset upon an assertion of the display Vsync signal and then count up upon generation of each emission pulse in the emission scan start pulse signal ESTV. In one implementation, the timing skew between the display Vsync signal and the external Vsync signal is determined as the difference between the count value of the EMsync counter and the count value of the emission counter.

The "long-V dimming" process achieves synchronization of the display Vsync signal with the external Vsync signal in the "long-V dimming" by extending one or more frame periods to compensate the timing skew between the display Vsync signal and the external Vsync signal. When the timing skew is determined as N times of the periodicity of the emission pulses, one or more frame periods are extended such that the total extension amount is N times of the periodicity of the emission pulses. In the embodiment shown in FIG. 10A, the timing skew is determined as twice of the periodicity of the emission pulses and a vertical front porch (VFP) period of one frame period is extended by twice of the periodicity of the emission pulses. The extended portion of VFP period is indicated by "VFP_EXT" in FIG. 10A.

Figure 10B:
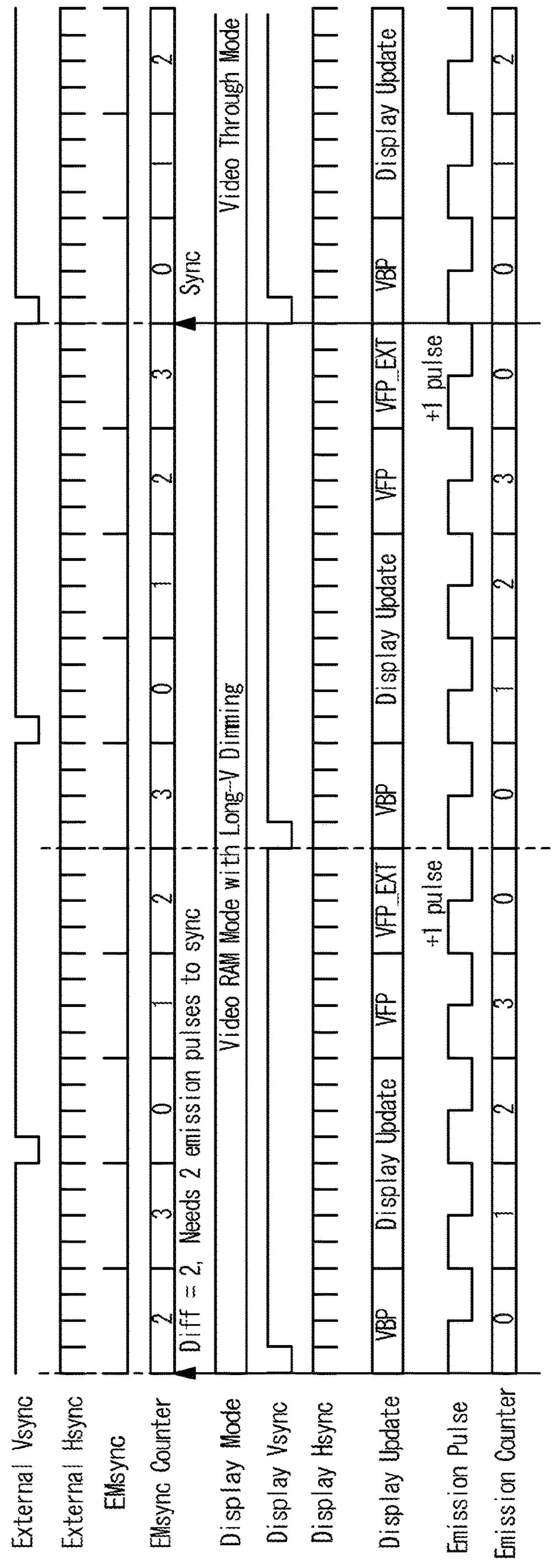
FIG. 10B shows another example "long-V dimming" process, according to one or more embodiments.

FIG. 10B shows another example "long-V dimming" process, according to one or more embodiments. In the shown embodiment, the timing skew between the display Vsync signal and the external Vsync signal is also determined as twice of the periodicity of the emission pulses while two frame periods are each extended by the periodicity of the emission pulses. Extending multiple frame periods to compensate the timing skew during the "long-V dimming" process suppresses changes in the frame period duration, mitigating the display image artifacts potentially caused by the changes in the frame period duration.

Figure 11:
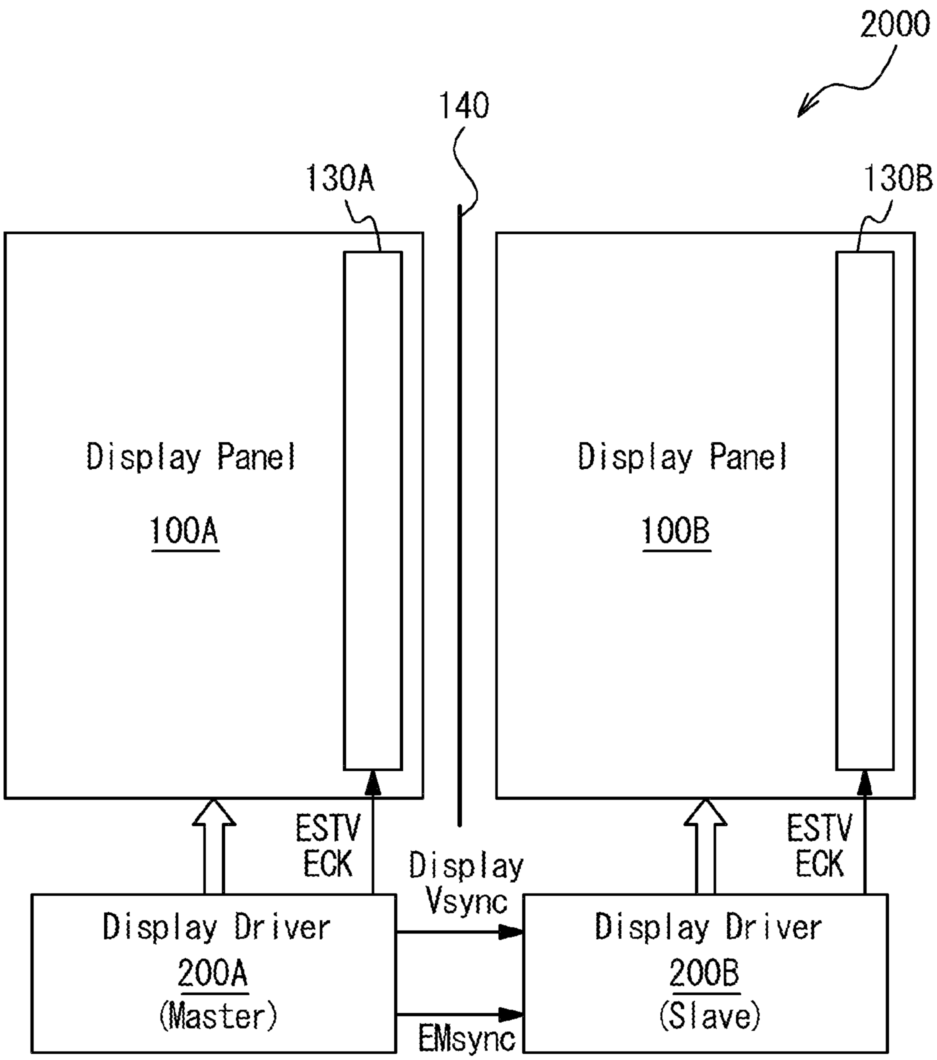
FIG. 11 shows an example configuration of a display device, according to one or more embodiments.

FIG. 11 shows an example configuration of a display device 2000, according to other embodiments. In the shown embodiment, the display device 2000 includes two display panels 100A and 100B, and two display drivers 200A and 200B. The display device 2000 is configured to be foldable with the display panels 100A and 100B coupled with a hinge 140. The display panels 100A and 100B may be each configured identically to the display panel 100 of FIG. 1. In FIG. 11, only the emission scan drivers 130A and 130B are shown for simplicity. The display driver 200A is configured to drive the display panel 100A and the display driver 200B is configured to drive the display panel 100B. The display drivers 200A and 200B are configured similarly to the display driver 200 shown in FIG. 3 except for that the display driver 200A is configured to control operation timing of the display driver 200B by providing the display Vsync signal and the emission synchronization signal EMsync to the display driver 200B. The display driver 200B uses the display Vsync signal received from the display driver 200A as the external Vsync signal. The display driver 200A, which is configured to control the display driver 200B, may be hereinafter also referred to as "master driver" while the display driver 200B may be hereinafter also referred to as "slave driver."

In one or more embodiments, the display device 2000 has two modes: an individual mode and a two panel sync mode. In the individual mode, the display driver 200A and 200B operate individually to display independent images, which are not related to each other, on the display panels 100A and 100B. In the two panel sync mode, the display driver 200A, which operates as the master driver, provides the display Vsync signal and the emission synchronization signal EMsync to the display driver 200B, which operates as the slave driver. The display driver 200B uses the display Vsync signal and the emission synchronization signal EMsync received from the display driver 200A as external sync control inputs and operates synchronously with the display Vsync signal and the emission synchronization signal EMsync received from the display driver 200A to display synchronized images on the display panels 100A and 100B. Since the display Vsync signal generated in the display driver 200A may be asynchronous with the display Vsync signal generated in the display driver 200B in the individual mode, mode switching from the individual mode to the two panel sync mode may cause display image artifacts since the mode switching may disturb the periodicity of the display Vsync signal in the display driver 200B. A description is given below of embodiments to mitigate display image artifacts potentially caused by the mode switching from the individual mode to the two panel sync mode.

Figure 12:
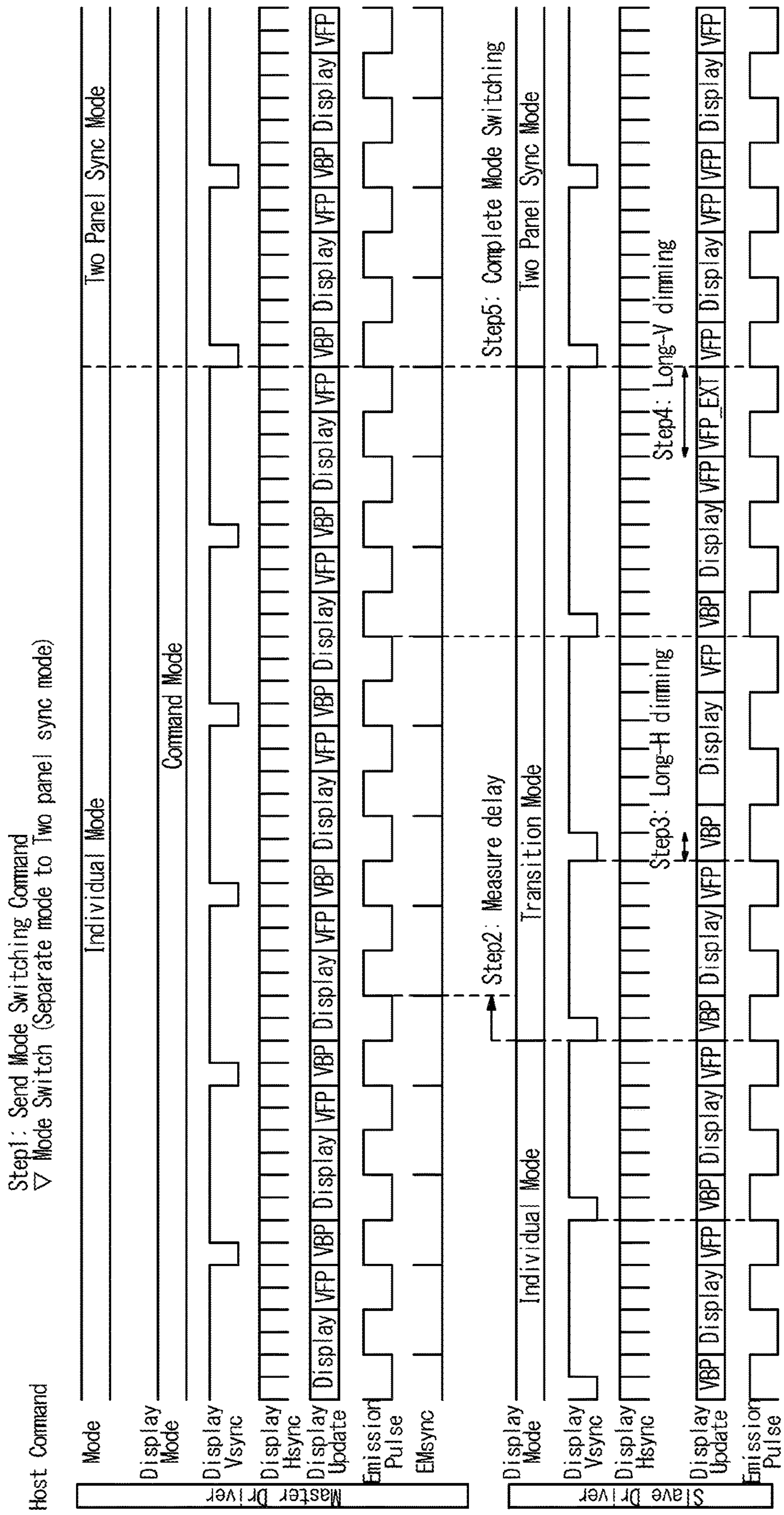
FIG. 12 shows an example operation of the display device, according to one or more embodiments.

FIG. 12 shows an example operation of the display device 2000 of FIG. 11 in mode switching from the individual mode to the two panel sync mode, according to one or more embodiments. In the shown embodiment, the display device 2000 is initially in the individual mode in which the display driver 200A and 200B operate individually. The display driver 200A and 200B individually receive commands that encapsulate image data from an external source and update the display panels 100A and 100B based on the image data encapsulated in the received command.

At step 1, an external source (e.g., a host, a controller, a processor, or other devices configured to provide commands) sends a mode switching command to the display driver 200A and 200B to instruct the display driver 200A and 200B to go into the two panel sync mode. The display driver 200B (which functions as the slave driver) is configured to go into a "transition mode" in response to reception of the mode switching command before going into the two panel sync mode. During the "transition mode", the display driver 200B adjusts the display Vsync signal generated by the display driver 200B based on the display Vsync signal and the emission synchronization signal EMsync which are both received from the display driver 200A such that the display Vsync signal generated by the display driver 200B is synchronized with the display Vsync signal received from the display driver 200A.

The adjustment of the display Vsync signal in the display driver 200B includes steps 2, 3 and 4 as discussed in the following. At step 2, the display driver 200B measures the delay between an assertion of the display Vsync signal generated by the display driver 200B and an assertion of the emission synchronization signal EMsync received from the display driver 200A. In the shown embodiment, the display driver 200B measures the delay from an assertion of the display Vsync signal generated by the display driver 200B to a subsequent assertion of the emission synchronization signal EMsync.

At step 3, the display driver 200B performs a "long-H dimming" process to compensate the delay measured at step 2. The "long-H dimming" process synchronizes the display Vsync signal generated by the display driver 200B with the emission synchronization signal EMsync received from the display driver 200A by adjusting the internal Hsync signal (and the display Hsync signal) generated by the display driver 200B. In one implementation, the display driver 200B extends one or more frame periods by decreasing the frequency of the internal Hsync signal (or increasing durations of line periods defined by the internal Hsync signal) generated by the display driver 200B during the long-H dimming process. In embodiments where two or more frame periods are extended by the long-H dimming, the extension amounts assigned to the extended frame periods are determined based on the delay measured at step 2. In one implementation, the sum of the extension amounts is equal to the delay from an assertion of the display Vsync signal generated by the display driver 200B to a subsequent assertion of the emission synchronization signal EMsync received from the display driver 200A. When the "long-H dimming" is completed as desired, the timing skew between the display Vsync signal generated by the display driver 200B and the display Vsync signal received from the display driver 200A is the same as the periodicity of the emission pulses or a multiple of periodicity of the emission pulses.

At step 4, the display driver 200B performs a "long-V dimming" process. The "long-V dimming" process synchronizes the display Vsync signal generated by the display driver 200B with the external Vsync signal received from the display driver 200A by adjusting the internal Vsync signal generated by the display driver 200B to extend one or more frame periods in increments of the periodicity of the emission pulses. In some embodiments, the display driver 200B extends a vertical front porch (VFP) period(s) of the one or more frame periods during the "long-V dimming" process. In FIG. 12, the extended portion of the vertical front porch period of the extended frame period is indicated by "VFP_EXT."

At step 5, the display driver 200B goes into the two panel sync mode to complete the mode transition. In the two panel sync mode, the display driver 200B updates the display panel 100B in synchronization with the display Vsync signal received from the display driver 200A.

Figure 13:
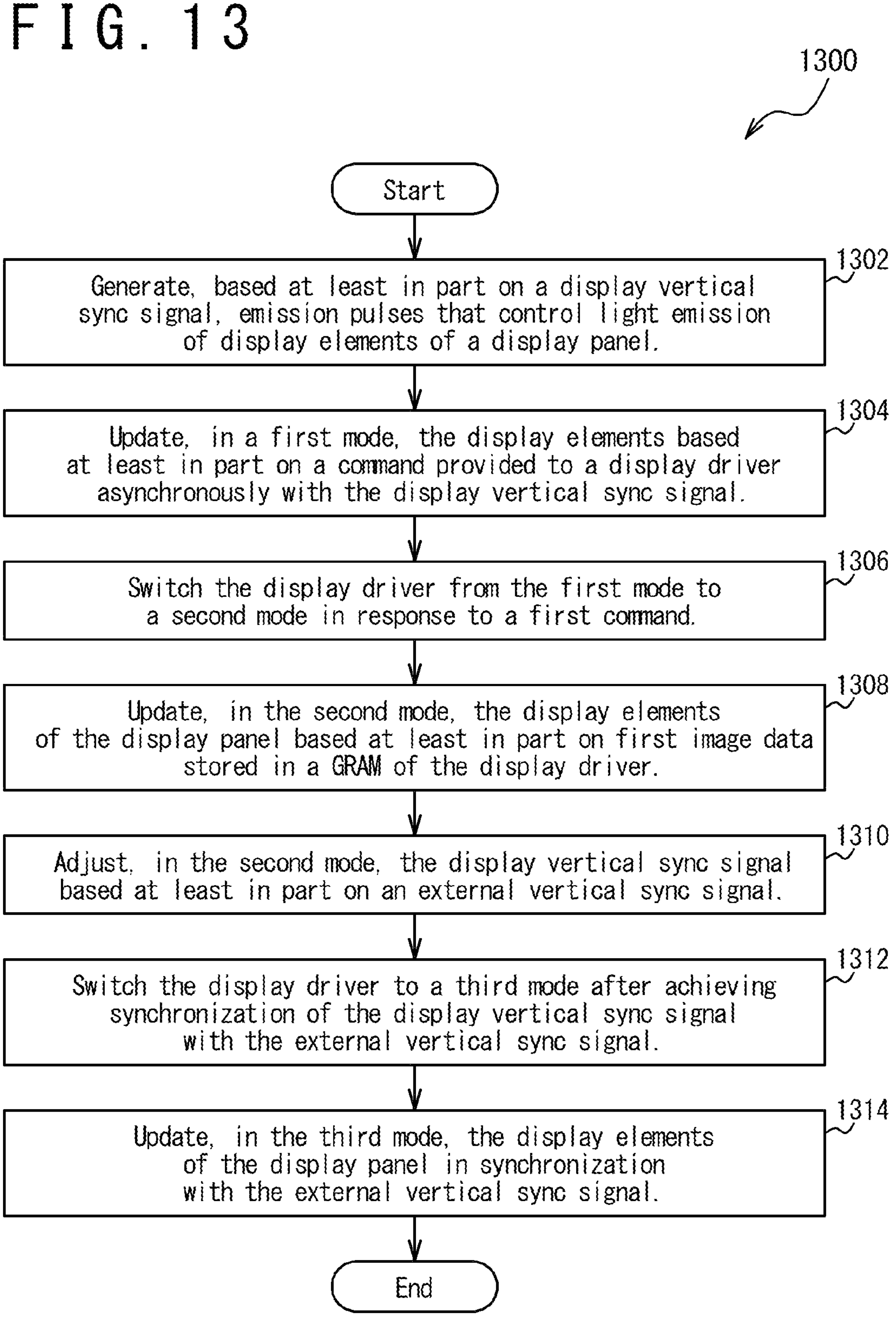
FIG. 13 shows an example method of driving a display panel, according to one or more embodiments.

Method 1300 of FIG. 13 illustrates example steps for driving a display panel (e.g., the display panels 100, 100A, and 100B of FIGS. 1 and 11), according to one or more embodiments. It is noted that one or more of the steps shown in FIG. 13 may be omitted, repeated, and/or performed in a different order. It is further noted that two or more steps may be implemented at the same time.

The method 1300 includes generating, based at least in part on a display vertical sync (Vsync) signal, emission pulses that control light emission of display elements of a display panel (e.g., the display panel 100 shown in FIG. 1) at step 1302. The method 1300 further includes updating, in a first mode (e.g., the command mode shown in FIGS. 4 and 6B and the individual mode shown in FIG. 12), the display elements based at least in part on a command provided to a display driver (e.g., the display driver 200 shown in FIG. 1 and the display driver 200B shown in FIG. 11) asynchronously with the display vertical sync signal at step 1304. The method 1300 further includes switching the display driver from the first mode to a second mode (e.g., the command mode shown in FIGS. 4 and 6B and the individual mode shown in FIG. 12) in response to a first command (e.g., the mode switching command shown in FIGS. 4, 6A, 6B, and 12) at step 1306. The method 1300 further includes updating, in the second mode, the display elements of the display panel based at least in part on first image data stored in a GRAM (e.g., the GRAM 216 shown in FIG. 3) of the display driver at step 1308. The method 1300 further includes adjusting, in the second mode, the display vertical sync signal based at least in part on an external vertical sync signal at step 1310. The method 1300 further includes switching the display driver to a third mode (e.g., the video through mode shown in FIGS. 4 and 6B and the two panel sync mode shown in FIG. 12) after achieving synchronization of the display vertical sync signal with the external vertical sync signal at step 1312. The method 1300 further includes updating, in the third mode, the display elements of the display panel in synchronization with the external vertical sync signal at step 1314.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:
a memory;
a data driver configured to:
in a first mode, update a display panel based at least in part on a command provided to the display driver asynchronously with a display vertical sync signal;
in a second mode, update the display panel based at least in part on first image data stored in the memory in synchronization with the display vertical sync signal; and
a control circuit configured to:
switch from the first mode to the second mode in response to a first command;
in the second mode, adjust the display vertical sync signal based at least in part on an external vertical sync signal, wherein adjusting the display vertical sync signal comprises adjusting a display horizontal sync signal to synchronize the display vertical sync signal with an emission sync signal, wherein the emission sync signal is generated in synchronization with the external vertical sync signal, wherein adjusting the display vertical sync signal comprises adjusting a periodicity of the display horizontal sync signal.

2. The display driver of claim 1, wherein:
the display driver is further configured to switch to a third mode after synchronization of the display vertical sync signal with the external vertical sync signal,
the second mode is a video memory mode in which the memory is configured to receive the first image data from a host, and
the third mode is a video through mode in which the data driver is further configured to update the display panel based at least in part on second image data received from the host, wherein the second image data bypasses the memory.

3. The display driver of claim 1, wherein:
the first mode is a command mode in which the memory is configured to store third image data, and
the data driver is configured to update the display panel based at least in part on the third image data stored in the memory in the command mode.

4. The display driver of claim 1, further comprising an emission pulse generator configured to generate, based at least in part on the display vertical sync signal, emission pulses that control light emission of a plurality of display elements of the display panel.

5. The display driver of claim 4, wherein adjusting the display vertical sync signal comprises:
measuring a delay between an assertion of the display vertical sync signal and an assertion of the emission sync signal; and
adjusting the display vertical sync signal based at least in part on the delay.

6. The display driver of claim 5, wherein adjusting the display vertical sync signal comprises:
assigning extension amounts to a plurality of frame periods, respectively, based at least in part on the delay; and
adjusting the display vertical sync signal to extend the plurality of frame periods by the assigned extension amounts, respectively.

7. The display driver of claim 4, wherein adjusting the display vertical sync signal comprises:
generating the emission sync signal in synchronization with the external vertical sync signal and having a same periodicity as a periodicity of the emission pulses;

synchronizing the display vertical sync signal with the emission sync signal; and adjusting the display vertical sync signal to extend one or more frame periods in increments of the periodicity of the emission pulses to synchronize the display vertical sync signal with the external vertical sync signal.

8. The display driver of claim 1, wherein adjusting the display vertical sync signal comprises:

extending a first frame period by a first extension amount;

extending a second frame period that starts after the first frame period by a second extension amount longer than the first extension amount; and extending a third frame period that starts after the second frame period by a third extension amount shorter than the second extension amount.

9. A display device, comprising:

a display panel comprising a plurality of display elements;

a display driver, comprising:

a memory;

a data driver configured to:

in a first mode, update the display elements based at least in part on a command provided to the display driver asynchronously with a display vertical sync signal generated in the display driver;

in a second mode, update the display elements of the display panel based at least in part on first image data stored in the memory; and a control circuit configured to:

switch from the first mode to the second mode in response to a first command;

in the second mode, adjust the display vertical sync signal based at least in part on an external vertical sync signal, wherein adjusting the display vertical sync signal comprises adjusting a display horizontal sync signal in order to synchronize the display vertical sync signal with an emission sync signal, wherein the emission sync signal is generated in synchronization with the external vertical sync signal, wherein adjusting the display vertical sync signal comprises adjusting a periodicity of the display horizontal sync signal.

10. The display device of claim 9, wherein:

the display driver is further configured to switch to a third mode after synchronization of the display vertical sync signal with the external vertical sync signal, the second mode is a video memory mode in which the memory is configured to receive the first image data from a host, and the third mode is a video through mode in which the display driver is further configured to update the display panel based at least in part on second image data received from the host, wherein the second image data bypasses the memory.

11. The display device of claim 9, wherein:

the first mode is a command mode in which the memory is configured to store third image data, and the display driver is configured to update the display elements of the display panel based at least in part on the third image data stored in the memory in the command mode.

12. The display device of claim 9, further comprising an emission pulse generator configured to generate, based at least in part on the display vertical sync signal, emission pulses that control light emission of the plurality of display elements.

13. The display device of claim 9, wherein adjusting the display vertical sync signal in the second mode comprises:

extending a first frame period by a first extension amount;

extending a second frame period that starts after the first frame period by a second extension amount longer than the first extension amount; and extending a third frame period that starts after the second frame period by a third extension amount shorter than the second extension amount.

14. A method, comprising:

updating, in a first mode, a display panel based at least in part on a command provided to a display driver asynchronously with a display vertical sync signal;

updating, in a second mode, the display panel based at least in part on first image data stored in a memory in synchronization with the display vertical sync signal;

switching from the first mode to the second mode in response to a first command; and adjusting, in the second mode, the display vertical sync signal based at least in part on an external vertical sync signal, wherein adjusting the display vertical sync signal comprises adjusting a display horizontal sync signal in order to synchronize the display vertical sync signal with an emission sync signal, wherein the emission sync signal is generated in synchronization with the external vertical sync signal-, wherein adjusting the display vertical sync signal comprises adjusting a periodicity of the display horizontal sync signal.

15. The method of claim 14, further comprising:

switching to a third mode after synchronization of the display vertical sync signal with the external vertical sync signal, wherein the second mode is a video memory mode in which the memory is configured to receive the first image data from a host, and the third mode is a video through mode in which the display driver is further configured to update the display panel based at least in part on second image data received from the host, wherein the second image data bypasses the memory.

16. The method of claim 14, further comprising:

generating, based at least in part on the display vertical sync signal, emission pulses that control light emission of a plurality of display elements;

measuring a delay between an assertion of the display vertical sync signal and an assertion of the emission sync signal; and adjusting the display vertical sync signal based at least in part on the delay.

17. The method of claim 14, wherein adjusting the display vertical sync signal comprises:

extending a first frame period by a first extension amount;

extending a second frame period that starts after the first frame period by a second extension amount longer than the first extension amount; and extending a third frame period that starts after the second frame period by a third extension amount shorter than the second extension amount.

* * * * *